US012179495B2

(12) United States Patent
Muto et al.

(10) Patent No.: US 12,179,495 B2
(45) Date of Patent: Dec. 31, 2024

(54) PRINTING APPARATUS AND INK FEEDING METHOD IN PRINTING APPARATUS

(71) Applicant: SCREEN HOLDINGS CO., LTD., Kyoto (JP)

(72) Inventors: Shogo Muto, Kyoto (JP); Kazuhiko Asada, Kyoto (JP)

(73) Assignee: Screen Holdings Co., Ltd., Kyoto (JP)

( * ) Notice: Subject to any disclaimer, the term of this patent is extended or adjusted under 35 U.S.C. 154(b) by 164 days.

(21) Appl. No.: 18/168,800

(22) Filed: Feb. 14, 2023

(65) Prior Publication Data

US 2023/0302814 A1 Sep. 28, 2023

(30) Foreign Application Priority Data

Mar. 22, 2022 (JP) ................................ 2022-045570

(51) Int. Cl.
*B41J 2/18* (2006.01)
*B41J 2/175* (2006.01)

(52) U.S. Cl.
CPC ............ *B41J 2/18* (2013.01); *B41J 2/17596* (2013.01)

(58) Field of Classification Search
CPC .......... B41J 2/18; B41J 2/17596; B41J 2/175
See application file for complete search history.

(56) References Cited

U.S. PATENT DOCUMENTS

| | | | | |
|---|---|---|---|---|
| 2019/0193404 | A1 | 6/2019 | Nishida | |
| 2019/0299626 | A1 | 10/2019 | Shimizu | |
| 2020/0094572 | A1* | 3/2020 | Muto | B41J 2/17566 |

FOREIGN PATENT DOCUMENTS

| | | | |
|---|---|---|---|
| JP | 2009-132019 | A | 6/2009 |
| JP | 2018-176666 | A | 11/2018 |
| JP | 2019-116054 | A | 7/2019 |
| JP | 2019-177549 | A | 10/2019 |
| JP | 2020-044823 | A | 3/2020 |
| JP | 2020-192709 | A | 12/2020 |

* cited by examiner

*Primary Examiner* — Bradley W Thies
(74) *Attorney, Agent, or Firm* — Rimon P.C.

(57) ABSTRACT

Closing the replenishing solenoid valve Vl1 and opening the return solenoid valve Vl2 prohibits passage of the ink fed using the replenishing pump 951 through the replenishing solenoid valve Vl1 and allows this ink to pass through the return solenoid valve Vl2. In this way, the ink is circulated along the circulation path Cc2 (second circulation path) along which the ink is fed from the buffer tank 95*a* to the branch point J though the replenishing pipe 95*b* and then fed from the branch point J to the buffer tank 95*a* through the return pipe 961.

16 Claims, 9 Drawing Sheets

FIG. 9

| CIRCULATION MODE | LIQUID LEVEL Lf OF SUPPLY TANK | LIQUID LEVEL Lr OF RECOVERY TANK | CIRCULATION PUMP 902 | REPLENISHING SOLENOID VALVE VL1 | RETURN SOLENOID VALVE VL2 |
|---|---|---|---|---|---|
| 1 | Low | Low | MAINTAIN | OPEN | CLOSE |
| 2 | Low | Mid | INCREASE | OPEN | CLOSE |
| 3 | Low | High | INCREASE | CLOSE | OPEN |
| 4 | Mid | Low | REDUCE | OPEN | CLOSE |
| 5 | Mid | Mid | MAINTAIN | CLOSE | OPEN |
| 6 | Mid | High | INCREASE | CLOSE | OPEN |
| 7 | High | Low | REDUCE | CLOSE | OPEN |
| 8 | High | Mid | REDUCE | CLOSE | OPEN |
| 9 | High | High | ZERO | CLOSE | OPEN |
| 10 | Ovf | | ZERO | CLOSE | OPEN |
| 11 | | Ovf | ZERO | CLOSE | OPEN |

PRINTING APPARATUS AND INK FEEDING METHOD IN PRINTING APPARATUS

CROSS REFERENCE TO RELATED APPLICATION

The disclosure of Japanese Patent Application No. 2022-045570 filed on Mar. 22, 2022 including specification, drawings and claims is incorporated herein by reference in its entirety.

BACKGROUND OF THE INVENTION

1. Field of the Invention

The present invention relates to a printing technique of ejecting ink, which is replenished into the ejection head from a buffer tank storing the ink, from an ejection head.

2. Description of the Related Art

A printing apparatus of JP2020-044823 includes a supply tank storing ink to be supplied to an ejection head, and a recovery tank storing the ink recovered from the ejection head. The ink is supplied to the ejection head by feeding the ink from the supply tank to the recovery tank via the ejection head. When the ink is consumed by the ejection of the ink from the ejection head, the ink is fed from a tank (main tank) storing ink for replenishing to the recovery tank.

SUMMARY OF THE INVENTION

In some cases, in a printing apparatus including a tank storing ink, a component of the ink settles out in the tank. In response to this, a circulation pump is provided in JP2020-044823 1 for feeding the ink from the recovery tank to the supply tank. By doing so, the ink having reached the recovery tank from the supply tank via the ejection head is returned from the recovery tank to the supply tank using the circulation pump. By circulating the ink between the supply tank and the recovery tank via the ejection head in this way, settling of the ink is reduced in the supply tank and the recovery tank. On the other hand, a tank storing the ink for replenishing (hereinafter called a "buffer tank") is not provided with a mechanism of ink circulation. For this reason, a component of the ink stored in the buffer tank settles out in some cases.

The present invention has been made in view of the above-described problem, and is intended to allow reduction in settling of a component of ink in a buffer tank storing the ink to be replenished into an ejection head.

A printing apparatus according to the invention comprises: an ejection head having a nozzle from which ink is to be ejected; a supply tank storing the ink to be supplied to the ejection head; a supply pipe forming flow path connection between the supply tank and the ejection head, and feeding the ink from the supply tank to the ejection head; a recovery tank storing the ink recovered from the ejection head; a recovery pipe forming flow path connection between the recovery tank and the ejection head, and feeding the ink from the ejection head to the recovery tank; a first return pipe forming flow path connection between the recovery tank and the supply tank, and feeding the ink from the recovery tank to the supply tank; a circulation pump provided in the first return pipe and arranged between the recovery tank and the supply tank, and feeding the ink from the recovery tank to the supply tank; a buffer tank storing the ink to be replenished into the recovery tank; a replenishing pipe forming flow path connection between the buffer tank and the recovery tank, and feeding the ink from the buffer tank to the recovery tank; a replenishing pump provided in the replenishing pipe and arranged between the buffer tank and the recovery tank, and feeding the ink from the buffer tank to the recovery tank; a first solenoid valve provided in the replenishing pipe and arranged between the replenishing pump and the recovery tank, allowing feeding of the ink from the buffer tank to the recovery tank through the replenishing pipe using the replenishing pump by being opened, and interrupting feeding of the ink from the buffer tank to the recovery tank through the replenishing pipe using the replenishing pump by being closed; a second return pipe forming flow path connection of a branch point provided in the replenishing pipe and arranged at a position between the first solenoid valve and the replenishing pump to the buffer tank, and feeding the ink from the branch point in the replenishing pipe to the buffer tank; a second solenoid valve provided in the second return pipe and arranged between the branch point and the buffer tank, allowing feeding of the ink from the branch point to the buffer tank through the second return pipe by being opened, and interrupting feeding of the ink from the branch point to the buffer tank through the second return pipe by being closed; and a control unit including a circulation pump controller that controls the circulation pump, a replenishing pump controller that controls the replenishing pump, a first solenoid valve controller that controls the first solenoid valve, and a second solenoid valve controller that controls the second solenoid valve, wherein if the circulation pump controller controls the circulation pump in such a manner as to feed the ink from the recovery tank toward the supply tank using the circulation pump, the ink is circulated along a first circulation path along which the ink is fed from the recovery tank to the supply tank through the first return pipe, is then fed to the ejection head through the supply pipe, and is further fed from the ejection head to the recovery tank through the recovery pipe, if the first solenoid valve controller controls the first solenoid valve in such a manner as to open the first solenoid valve, if the second solenoid valve controller controls the second solenoid valve in such a manner as to close the second solenoid valve, and if the replenishing pump controller controls the replenishing pump in such a manner as to feed the ink from the buffer tank toward the recovery tank using the replenishing pump, the ink is replenished into the recovery tank along a replenishing path along which the ink is fed from the buffer tank via the first solenoid valve to the recovery tank through the replenishing pipe, and if the first solenoid valve controller controls the first solenoid valve in such a manner as to close the first solenoid valve, if the second solenoid valve controller controls the second solenoid valve in such a manner as to open the second solenoid valve, and if the replenishing pump controller controls the replenishing pump in such a manner as to feed the ink from the buffer tank toward the branch point using the replenishing pump, the ink is circulated along a second circulation path along which the ink is fed from the buffer tank to the branch point though the replenishing pipe and then fed from the branch point to the buffer tank through the second return pipe.

An ink feeding method according to the invention is a method in a printing apparatus including: an ejection head having a nozzle from which ink is to be ejected; a supply tank storing the ink to be supplied to the ejection head; a supply pipe forming flow path connection between the supply tank and the ejection head, and feeding the ink from the supply tank to the ejection head; a recovery tank storing the ink recovered from the ejection head; a recovery pipe forming flow path connection between the recovery tank and the ejection head, and feeding the ink from the ejection head to the recovery tank; a first return pipe forming flow path connection between the recovery tank and the supply tank, and feeding the ink from the recovery tank to the supply tank; and a circulation pump provided in the first return pipe and arranged between the recovery tank and the supply tank, and feeding the ink from the recovery tank to the supply tank, the method comprising: a first circulation step of feeding the ink from the recovery tank toward the supply tank using the circulation pump, thereby feeding the ink from the recovery tank to the supply tank through the first return pipe, then feeding the ink from the supply tank to the ejection head through the supply pipe, and further feeding the ink from the ejection head to the recovery tank through the recovery pipe; a replenishing step of feeding the ink from a buffer tank to the recovery tank through a replenishing pipe using a replenishing pump provided in the replenishing pipe, the buffer tank storing the ink to be replenished into the recovery tank, the replenishing pipe forming flow path connection between the buffer tank and the recovery tank and feeding the ink from the buffer tank to the recovery tank; and a second circulation step of feeding the ink from the buffer tank using the replenishing pump to a branch point provided in the replenishing pipe and arranged between the replenishing pump and the recovery tank, thereby feeding the ink from the buffer tank to the branch point through the replenishing pipe and then feeding the ink from the branch point to the buffer tank through a second return pipe forming flow path connection between the branch point and the buffer tank, wherein the replenishing pipe is provided with a first solenoid valve arranged at a position between the branch point and the recovery tank, the first solenoid valve allows feeding of the ink from the buffer tank to the recovery tank through the replenishing pipe using the replenishing pump by being opened, and interrupts feeding of the ink from the buffer tank to the recovery tank through the replenishing pipe using the replenishing pump by being closed, the second return pipe is provided with a second solenoid valve arranged at a position between the branch point and the buffer tank, the second solenoid valve allows feeding of the ink from the branch point to the buffer tank through the second return pipe by being opened, and interrupts feeding of the ink from the branch point to the buffer tank through the second return pipe by being closed, in the replenishing step, the first solenoid valve is opened and the second solenoid valve is closed to feed the ink from the buffer tank toward the recovery tank using the replenishing pump, thereby feeding the ink from the buffer tank to the recovery tank via the first solenoid valve through the replenishing pipe, and in the second circulation step, the first solenoid valve is closed and the second solenoid valve is opened to feed the ink from the buffer tank toward the branch point using the replenishing pump, thereby feeding the ink from the buffer tank to the branch point through the replenishing pipe and then feeding the ink from the branch point to the buffer tank through the second return pipe.

According to the present invention having the above-described configuration, the ink is circulated along the first circulation path along which the ink is fed from the recovery tank to the supply tank through the first return pipe, is then fed to the ejection head through the supply pipe, and is further fed from the ejection head to the recovery tank through the recovery pipe (first circulation step). This reduces settling of a component of the ink stored in each of the supply tank and the recovery tank. The replenishing pump is attached to the replenishing pipe forming connection between the buffer tank and the recovery tank. Thus, when the ink is consumed by ejection of the ink from the ejection head, the ink can be replenished from the buffer tank into the recovery tank through the replenishing pipe using the replenishing pump (replenishing step).

In particular, according to the present invention, the second return pipe is provided that forms flow path connection of the branch point provided in the replenishing pipe and arranged between the replenishing pump and the recovery tank to the buffer tank. Furthermore, the replenishing pipe is provided with the first solenoid valve arranged between the branch point and the recovery tank. The second return pipe is provided with the second solenoid valve arranged between the branch point and the buffer tank. Opening the first solenoid valve allows feeding of the ink from the buffer tank to the recovery tank through the replenishing pipe using the replenishing pump. Closing the first solenoid valve interrupts feeding of the ink from the buffer tank to the recovery tank through the replenishing pipe using the replenishing pump. Opening the second solenoid valve allows feeding of the ink from the branch point to the buffer tank through the second return pipe. Closing the second solenoid valve interrupts feeding of the ink from the branch point to the buffer tank through the second return pipe. Thus, opening the first solenoid valve and closing the second solenoid valve allows the ink fed using the replenishing pump to pass through the first solenoid valve and prohibits passage of this ink through the second solenoid valve. By doing so, the replenishing pump becomes capable of replenishing the ink from the buffer tank into the recovery tank via the first solenoid valve as described above. Meanwhile, closing the first solenoid valve and opening the second solenoid valve prohibits passage of the ink fed using the replenishing pump through the first solenoid valve and allows this ink to pass through the second solenoid valve. In this way, the ink is circulated along the second circulation path along which the ink is fed from the buffer tank to the branch point though the replenishing pipe and then fed from the branch point to the buffer tank through the second return pipe (second circulation step). As a result, settling of a component of the ink is reduced in the buffer tank storing the ink to be replenished into the ejection head.

Additionally, according to the present invention, the replenishing pump is responsible for both the operation of replenishing the ink from the buffer tank into the recovery tank and the operation of circulating the ink along the second circulation path. This achieves further effect of reducing the number of pumps compared to a configuration of providing two pumps for the respective operations.

As described above, according to the present invention, it is possible to reduce settling of a component of the ink in the buffer tank storing the ink to be replenished into the ejection head.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 9 shows an example of circulation mode data in a table format referred to in performing the circulation mode control shown in FIG. 8.

DETAILED DESCRIPTION OF THE PREFERRED EMBODIMENTS

Figure 1:
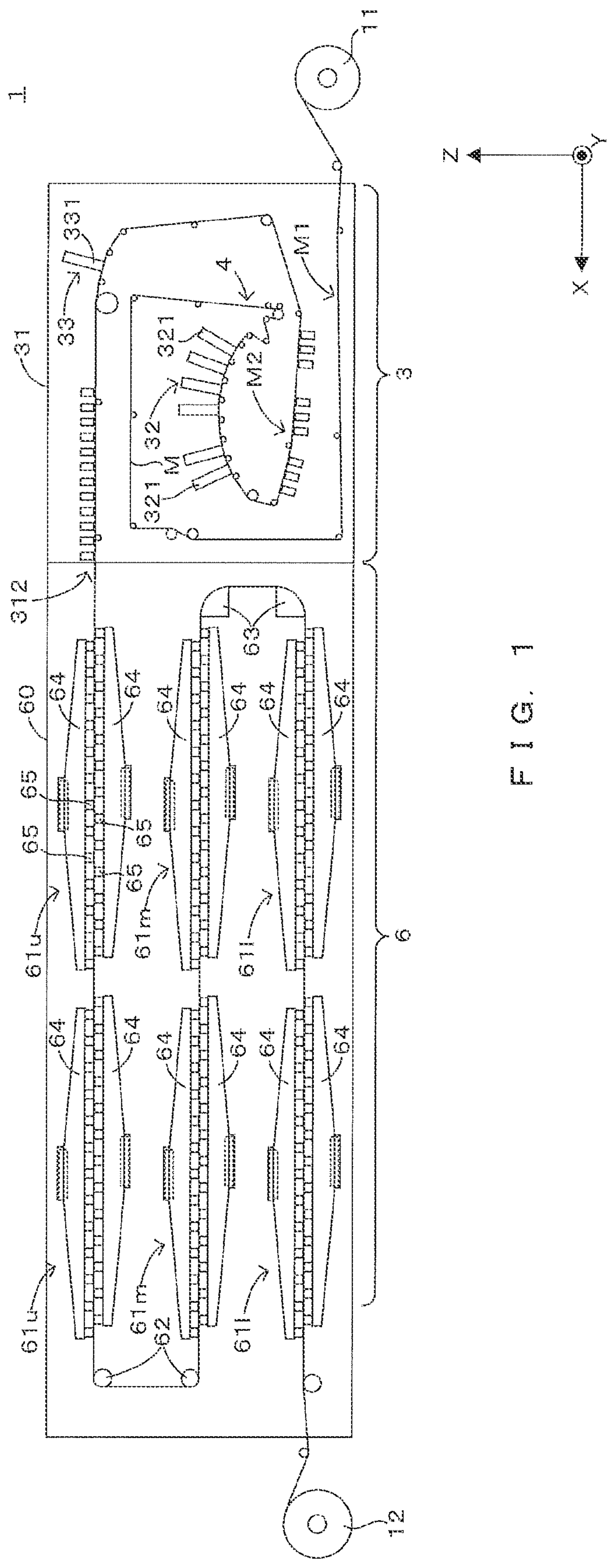
FIG. 1 is a front view schematically showing an example of a printing system including a printing apparatus according to the present invention.

FIG. 1 is a front view schematically showing an example of a printing system including a printing apparatus according to the present invention. In FIG. 1 and in the drawings referred to below, an X direction corresponding to a horizontal direction, a Y direction corresponding to a horizontal direction perpendicular to the X direction, and a Z direction corresponding to a vertical direction are shown as appropriate. As shown in FIG. 1, a printing system 1 includes a printing apparatus 3 and a drying apparatus 6 arranged in the X direction. The printing system 1 transfers an elongated strip-shaped printing medium M in a roll-to-roll process from a feed roll 11 to a wind-up roll 12. A material of the printing medium M is a film made of oriented polypropylene (OPP) or polyethylene terephthalate (PET), for example. However, the material of the printing medium M is not limited to a film but may be paper, for example. The printing medium M has flexibility. In the following, a surface of both surfaces of the printing medium M on which an image is to be printed is called a front surface M1, and a surface on the opposite side to the front surface M1 is called a back surface M2 as appropriate.

The printing apparatus 3 prints an image on the front surface M1 of the printing medium M by ejecting aqueous ink by the inkjet method onto the front surface M1 of the printing medium M while the printing medium M is transferred from the feed roll 11 to the wind-up roll 12. The configuration of the printing apparatus 3 will be described later in detail. The printing medium M on which the image is printed in this way is transferred in the X direction from the printing apparatus 3 toward the drying apparatus 6.

The drying apparatus 6 includes a drying furnace 60, and dries the printing medium M unloaded from the printing apparatus 3 in response to the transfer from the feed roll 11 toward the wind-up roll 12. The drying furnace 60 includes two upper-stage blower units 61*u* arranged in the X direction, two middle-stage blower units 61*m* provided below the upper-stage blower units 61*u* and arranged in the X direction, and two lower-stage blower units 611 provided below the middle-stage blower units 61*m* and arranged in the X direction that are provided inside the drying furnace 60.

The printing medium M unloaded from an outlet 312 of the printing apparatus 3 passes through the two upper-stage blower units 61*u* in the X direction, and is then folded over by a pair of rollers 62 toward the two middle-stage blower units 61*m*. Next, the printing medium M passes through the two middle-stage blower units 61*m* in the X direction, and is then folded over by a pair of air turn bars 63 toward the two lower-stage blower units 611. Next, the printing medium M passes through the two lower-stage blower units 611 in the X direction, and is then unloaded to the outside of the drying apparatus 6.

The upper-stage blower unit 61*u* includes two blower chambers 64 arranged in such a manner that the printing medium M moving in the X direction is sandwiched between the blower chambers 64 from the Z direction. Each of the blower chambers 64 includes a plurality of nozzles 65 arranged in the X direction, and hot air (gas of equal to or greater than 60 degrees in temperature) is injected from each of the nozzles 65 onto the printing medium M. By doing so, while the printing medium M moves between the two blower chambers 64 provided one above the other, the printing medium M is dried with the hot air injected from the nozzles 65 of these blower chambers 64. Like the upper-stage blower unit 61*u*, each of the middle-stage blower unit 61*m* and the lower-stage blower unit 611 includes two blower chambers 64 between which the printing medium M is sandwiched from the Z direction.

The specific configuration of the upper-stage blower unit 61*u* is not limited to that explained in this example. For example, the lower blower chamber 64 of the upper and lower blower chambers 64 of the upper-stage blower unit 61*u* may be replaced with a plurality of rollers arranged in the X direction. This configuration allows injection of hot air onto the front surface M1 of the printing medium M from the upper blower chamber 64 while supporting the back surface M2 of the printing medium M from below using these rollers.

Figure 2:
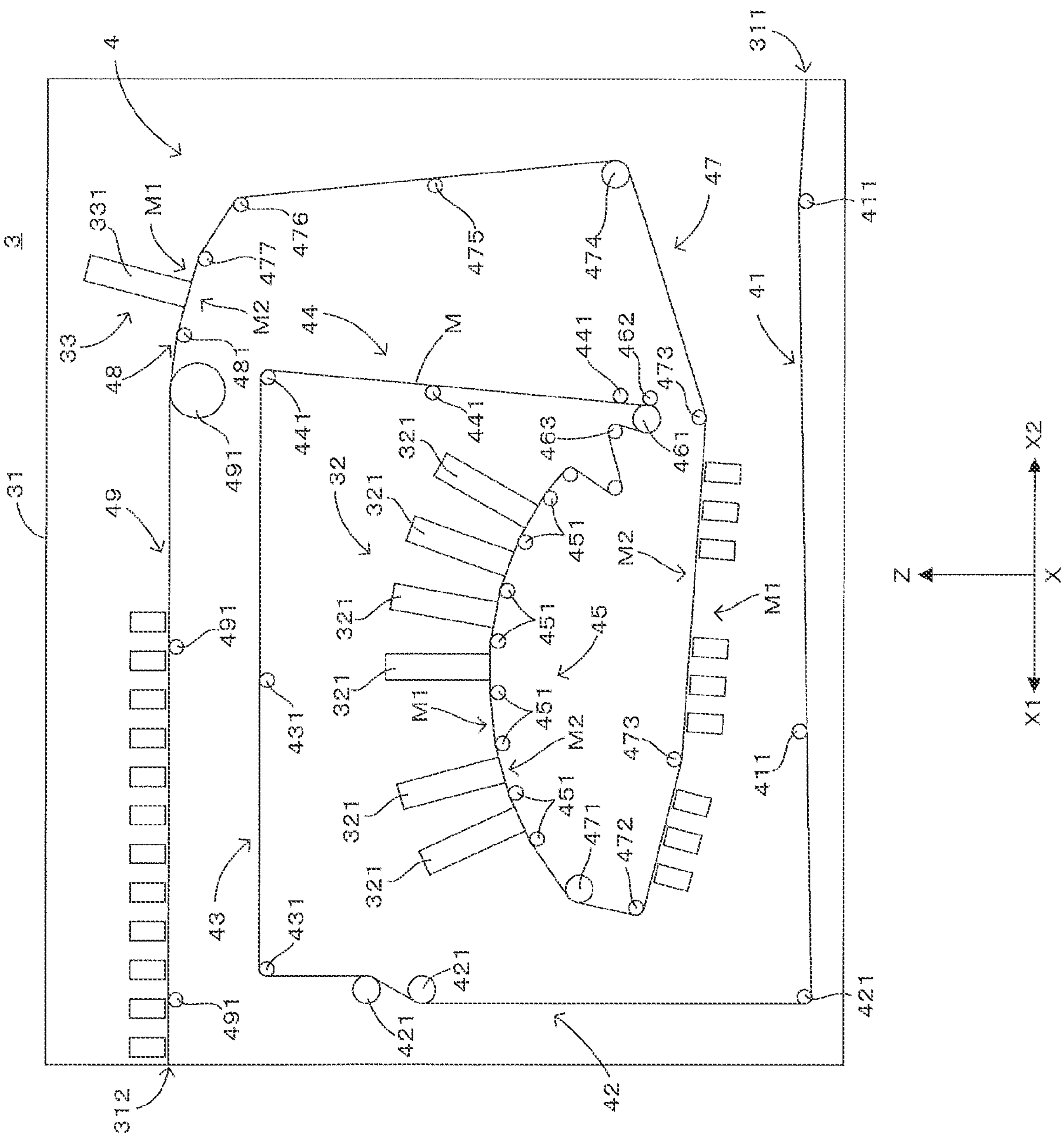
FIG. 2 is a front view schematically showing the printing apparatus of the printing system shown in FIG. 1.

FIG. 2 is a front view schematically showing the printing apparatus of the printing system shown in FIG. 1. In FIG. 2, one side X1 side and the other side X2 side of the X direction are shown as appropriate. The one side X1 is a side from the printing apparatus 3 toward the drying apparatus 6. The other side X2 is the opposite side to the one side X1. The printing apparatus 3 includes a housing 31, a color printing part 32 arranged in the housing 31, a white printing part 33 arranged above the color printing part 32 in the housing 31, and a transfer part 4 that transfers the printing medium M using a plurality of rollers arranged in the housing 31.

The color printing part 32 includes a plurality of (six) head units 321 provided above the printing medium M transferred by the transfer part 4 and arranged in a traveling direction (a direction from the other side X2 toward the one side X1) of the printing medium M. The head units 321 include nozzles facing the front surface M1 of the printing medium M, which is passing through positions below the head units 321, from above, and eject color inks different from each other from the nozzles by the inkjet method. The color inks mentioned herein mean inks of colors other than white, and include inks of cyan, magenta, yellow, and black, for example. In this configuration, the plurality of head units 321 of the color printing part 32 eject the color inks from above onto the front surface M1 of the printing medium M passing through positions below the head units 321, thereby printing a color image on the front surface M1 of the printing medium M.

The white printing part 33 includes a single head unit 331 arranged above the printing medium M transferred by the transfer part 4. The head unit 331 includes a nozzle facing the front surface M1 of the printing medium M, which is passing through a position below the head unit 331, from above, and ejects white ink from the nozzle by the inkjet method. In this configuration, the head unit 331 of the white printing part 33 ejects the white ink from above onto the front surface M1 of the printing medium M passing through a position below the head unit 331, thereby printing a white image on the front surface M1 of the printing medium M.

An inlet 311 is opened at a side wall of the housing 31 on the other side X2 and an outlet 312 is opened at a side wall of the housing 31 on the one side X1. The transfer part 4 transfers the printing medium M from the inlet 311 to the outlet 312 while passing the printing medium M through the color printing part 32 and the white printing part 33.

The transfer part 4 includes a loading section 41 provided below the color printing part 32, an upward transfer section 42 provided on the one side X1 relative to the color printing part 32, an upper transfer section 43 provided above the color printing part 32, and a downward transfer section 44 provided on the other side X2 relative to the color printing part 32. The loading section 41 transfers the printing medium M having been loaded through the inlet 311 toward the one side X1 using a roller 411. The upward transfer section 42 transfers the printing medium M upward having been transferred by the loading section 41 using a roller 421. The upper transfer section 43 transfers the printing medium M toward the other side X2 having been transferred by the upward transfer section 42 using a roller 431. The downward transfer section 44 transfers the printing medium M downward having been transferred by the upper transfer section 43 using a roller 441.

The transfer part 4 further includes a color transfer section 45 supporting the printing medium M, which faces the color printing part 32, from below. The printing medium M having passed through the downward transfer section 44 goes into the color transfer section 45. The color transfer section 45 includes a plurality of rollers 451 arranged from the other side X2 toward the one side X1. Each of the rollers 451 contacts the back surface M2 of the printing medium M from below. The front surface M1 of the printing medium M supported by the color transfer section 45 in this way is pointed upward and each of the head units 321 of the color printing part 32 ejects a color ink onto the front surface M1 while facing the front surface M1 from above.

The transfer part 4 includes a roller 461, a roller 462, and a roller 463 arranged between the color transfer section 45 and the downward transfer section 44 in a traveling direction of the printing medium M. The roller 461 is a driving roller that drives the printing medium M. The rollers 462 and 463 are driven rollers that are driven to rotate by the printing medium M.

The transfer part 4 further includes a reversing transfer section 47 that reverses the printing medium M, having been transferred from the color transfer section 45 toward the one side X1, up and down twice. The reversing transfer section 47 includes a plurality of rollers 471 to 477 including a driving roller 471. While the rollers 471 to 477 contact the back surface M2 of the printing medium M, the printing medium M is reversed up and down twice.

Specifically, the reversing transfer section 47 transfers the printing medium M in a downward direction, having been transferred from the color transfer section 45, using the rollers 471 and 472, and changes a traveling direction of the printing medium M to a direction toward the other side X2 using the roller 472, thereby reversing the front surface M1 and the back surface M2 of the printing medium M up and down. Next, the reversing transfer section 47 transfers the printing medium M from the one side X1 toward the other side X2 using a plurality of the rollers 473, and then transfers the printing medium M in an upward direction using the rollers 474-476. The reversing transfer section 47 further changes a traveling direction of the printing medium M to a direction toward the one side X1 using the roller 476, thereby reversing the front surface M1 and the back surface M2 of the printing medium M up and down again and transferring the printing medium M from the other side X2 toward the one side X1 using the roller 477.

The transfer part 4 includes a white transfer section 48 supporting the printing medium M, which faces the white printing part 33, from below. After the printing medium M is reversed up and down twice by the reversing transfer section 47, the printing medium M goes into the white transfer section 48. The white transfer section 48 includes a roller 481 to contact the back surface M2 of the printing medium M from below. The front surface M1 of the printing medium M supported by the white transfer section 48 in this way is pointed upward and the head unit 331 of the white printing part 33 ejects the white ink onto the front surface M1 while facing the front surface M1 from above.

The transfer part 4 includes an unloading section 49 provided above the upper transfer section 43. The unloading section 49 includes a plurality of rollers 491 arranged from the other side X2 toward the one side X1 of the X direction. The unloading section 49 transfers the printing medium M, having been transferred by the white transfer section 48, toward the one side X1 using the rollers 491, thereby unloading the printing medium M through the outlet 312 of the housing 31 toward the drying apparatus 6.

As described above, the color printing part 32 and the white printing part 33 of the printing apparatus 3 include the head units 321 and the head unit 331 respectively. Described next is ejection heads H of the head units 321 and the head unit 331 and an ink supply, recovery, replenishing, and circulation mechanism 9 for supplying, recovering, replenishing, and circulating ink for the ejection heads H. The configuration of the ink supply, recovery, replenishing, and circulation mechanism 9 includes an ink supply mechanism 9*a* that supplies ink to the ejection head H, an ink recovery mechanism 9*b* that recovers ink from the ejection head H, an ink return mechanism 9*c* that returns the recovered ink again to the ink supply mechanism 9*a*, an ink replenishing mechanism 9*d* that replenishes the ink into the ink recovery mechanism 9*b*, and an ink return mechanism 9*e* that returns the ink branched off from the ink replenishing mechanism 9*d* again to the ink replenishing mechanism 9*d*. The head units 321 and the head unit 331 have basic configurations common to each other and the basic configuration of the ink supply, recovery, replenishing, and circulation mechanism 9 is common between the head units 321 and the head unit 331. Then, a configuration described next relates to the head unit 331 for ejection of the white ink.

Figure 3:
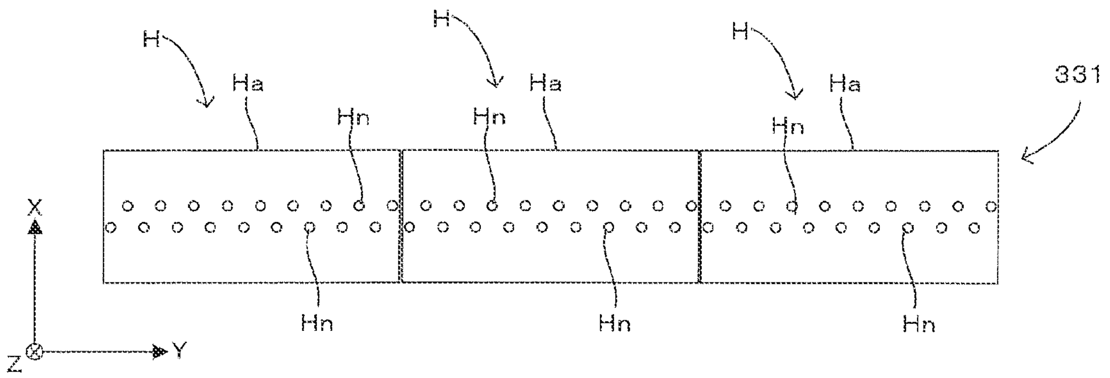
FIG. 3 schematically shows the bottom surface of the ejection head of the head unit.
Figure 4:
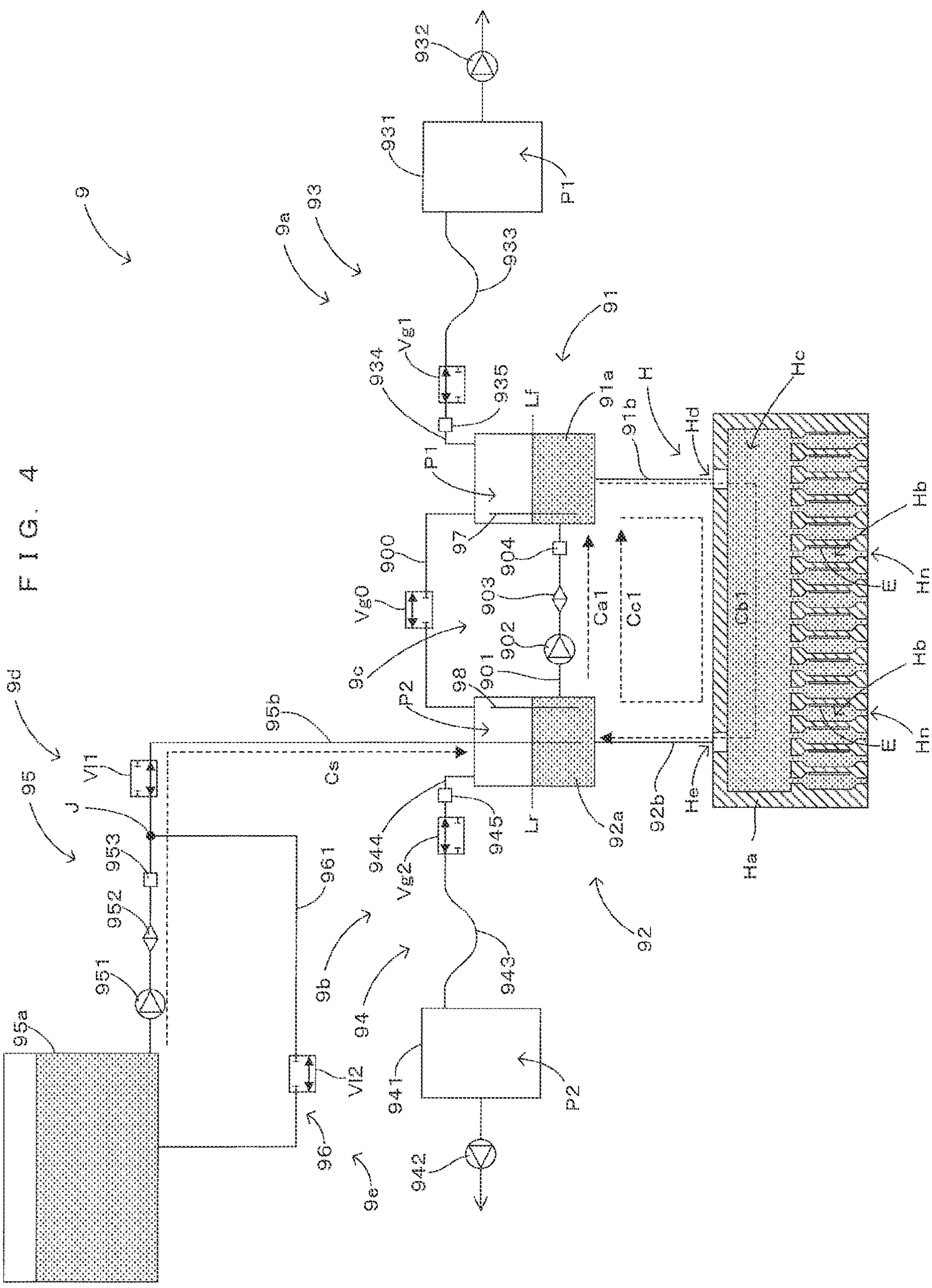
FIG. 4 schematically shows the configuration of the ejection head and the configuration of the ink supply, recovery, replenishing, and circulation mechanism 9 for supplying, recovering, replenishing, and circulating ink for the ejection head.

FIG. 3 schematically shows the bottom surface of the ejection head of the head unit. FIG. 4 schematically shows the configuration of the ejection head and the configuration of the ink supply, recovery, replenishing, and circulation mechanism 9 for supplying, recovering, replenishing, and circulating ink for the ejection head. As shown in FIG. 3, the head unit 331 includes a plurality of ejection heads H aligned in the Y direction from which inks of the same color (white ink) are to be ejected. Each of the ejection heads H has a rectangular shape in a bottom view. The arrangement of the ejection heads H is not limited to the example shown in FIG. 3 but the ejection heads H may be arranged in a staggered pattern.

As shown in FIG. 4, the ejection head H has a housing Ha and the housing Ha has a bottom surface provided with a plurality of nozzles Hn opening and arranged in the Y direction in a staggered pattern. The housing Ha is provided therein with a plurality of cavities Hb respectively communicating with a plurality of the nozzles Hn and an ink supply chamber Hc communicating with the cavities Hb. Ink supplied from the ink supply chamber Hc is stored in the cavities Hb. Each of the cavities Hb is provided with a piezoelectric element E. The piezoelectric element E displaces in response to a driving signal (electrical signal) to apply pressure fluctuation to the ink in the cavity Hb. In response to this pressure fluctuation, the ink is pushed from the cavity Hb to eject the ink from the nozzle Hn communicating with this cavity Hb. An ink inflow port Hd and an ink outflow port He are opened at the top of the ejection head H. The ink flows from the ink supply mechanism 9*a* into the ink supply chamber Hc via the ink inflow port Hd and flows out from the ink supply chamber Hc toward the ink recovery mechanism 9*b* via the ink outflow port He.

The ink supply mechanism 9*a* includes an ink supplier 91 that supplies the ink toward the ejection head H, and a pressure generator 93 that generates supply pressure to be applied to the ink supplier 91. The ink supplier 91 includes a supply tank 91*a* storing the ink to be supplied to the ejection head H, and a supply pipe 91*b* forming flow path connection between the supply tank 91*a* and the ejection head H and feeding the ink supplied from the supply tank 91*a* to the ejection head H.

The ink recovery mechanism 9*b* includes an ink recovery part 92 that recovers the ink from the ejection head H, and a pressure generator 94 that generates pressure to be applied to the ink recovery part 92. The ink recovery part 92 includes a recovery tank 92*a* storing the ink recovered from the ejection head H, and a recovery pipe 92*b* forming flow path connection between the recovery tank 92*a* and the ejection head H and feeding the ink recovered from the ejection head H to the recovery tank 92*a*. The supply tank 91*a* and the recovery tank 92*a* are both arranged above the ejection head H.

The ink return mechanism 9*c* includes a return pipe 901 forming flow path connection between the recovery tank 92*a* and the supply tank 91*a* and feeding the ink from the recovery tank 92*a* to the supply tank 91*a*, a circulation pump 902 interposed into a position along the return pipe 901, a filter 903 interposed into a position along the return pipe 901 and arranged between the circulation pump 902 and the supply tank 91*a*, and a degasser 904 interposed into a position along the return pipe 901 and arranged between the filter 903 and the supply tank 91*a*. The circulation pump 902 feeds the ink from the recovery tank 92*a* to the supply tank 91*a*. The filter 903 removes a foreign matter from the ink after flowing out of the circulation pump 902 and before flowing into the degasser 904. The degasser 904 performs degassing on the ink after flowing out of the filter 903 and before flowing into the supply tank 91*a*. The ink return mechanism 9*c* described above is configured to feed the ink using the circulation pump 902 along a return path Ca1 starting from the recovery tank 92*a* and reaching the supply tank 91*a* through the return pipe 901.

The ink supply mechanism 9*a* includes the supply-side pressure generator 93 (hereinafter called "pressure generator 93" as appropriate) that applies a pressure P1 (negative pressure) to the supply tank 91*a*. The pressure generator 93 includes a pressure tank 931, an exhaust pump 932 that exhausts air from the pressure tank 931 and generates the pressure P1 in the pressure tank 931, a flexible tube 933 having one end connected to the pressure tank 931, and a pressure transmission pipe 934 having one end communicably connected to the other end of the tube 933, having the other end arranged in such a manner as to face an atmosphere in the supply tank 91*a*, and transmitting pressure generated in the pressure tank 931 to the supply tank 91*a*. The pressure P1 generated in the pressure tank 931 by the exhaust pump 932 is applied through the tube 933 and the pressure transmission pipe 934 to the supply tank 91*a*.

Meanwhile, in the supply tank 91*a*, gas (air) is accumulated over a liquid surface of the ink. Specifically, in the supply tank 91*a*, the ink is stored under the gas-liquid interface and the gas is present over the gas-liquid interface. This means that the pressure generator 93 applies the pressure P1 (negative pressure) to the gas-liquid interface in the supply tank 91*a*.

The ink supply mechanism 9*a* includes a solenoid valve Vg1 provided between the other end of the tube 933 of the pressure generator 93 and the one end of the pressure transmission pipe 934. The solenoid valve Vg1 provides communication or interrupts the communication between an atmosphere in the pressure tank 931 and an atmosphere in the supply tank 91*a* to perform application or interrupt the application of the pressure P1 generated in the pressure tank 931 to the supply tank 91*a*. Specifically, as shown in FIG. 4, when the solenoid valve Vg1 is opened, an atmosphere in the pressure tank 931 and an atmosphere in the supply tank 91*a* communicate with each other to apply the pressure P1 from the pressure tank 931 to the supply tank 91*a* through the tube 933 and the pressure transmission pipe 934. On the other hand, when the solenoid valve Vg1 is closed, the communication between an atmosphere in the pressure tank 931 and an atmosphere in the supply tank 91*a* is interrupted to stop application of the pressure P1 from the pressure tank 931 to the supply tank 91*a*. As shown in FIG. 4, the solenoid valve Vg1 is opened to provide communication between an atmosphere in the pressure tank 931 and an atmosphere in the supply tank 91*a* when energized. On the other hand, the solenoid valve Vg1 is closed to interrupt the communication between an atmosphere in the pressure tank 931 and an atmosphere in the supply tank 91*a* when de-energized.

At the ink supply mechanism 9*a*, a stop filter 935 is interposed in the pressure transmission pipe 934. The stop filter 935 prohibits passage of the ink from the supply tank 91*a* toward the pressure tank 931 while allowing passage of gas from the supply tank 91 a toward the pressure tank 931. In this way, the stop filter 935 prevents the ink from flowing from the supply tank 91*a* into the tube 933.

The ink recovery mechanism 9*b* includes the recovery-side pressure generator 94 (hereinafter called "pressure generator 94" as appropriate) that applies a pressure P2 (negative pressure) to the recovery tank 92*a*. The pressure generator 94 includes a pressure tank 941, an exhaust pump 942 that exhausts air from the pressure tank 941 and generates the pressure P2 in the pressure tank 941, a flexible tube 943 having one end connected to the pressure tank 941, and a pressure transmission pipe 944 having one end communicably connected to the other end of the tube 943, having the other end arranged in such a manner as to face an atmosphere in the recovery tank 92*a*, and transmitting pressure generated in the pressure tank 941 to the recovery tank 92*a*. The pressure P2 generated in the pressure tank 941 by the exhaust pump 942 is applied through the tube 943 and the pressure transmission pipe 944 to the recovery tank 92*a*.

Meanwhile, in the recovery tank 92*a*, gas (air) is accumulated over a liquid surface of the ink. Specifically, in the recovery tank 92*a*, the ink is stored under the gas-liquid interface and the gas is present over the gas-liquid interface. This means that the pressure generator 94 applies the pressure P2 (negative pressure) to the gas-liquid interface in the recovery tank 92*a*.

The ink recovery mechanism 9*b* includes a solenoid valve Vg2 provided between the other end of the tube 943 of the pressure generator 94 and the one end of the pressure transmission pipe 944. The solenoid valve Vg2 provides communication or interrupts the communication between an atmosphere in the pressure tank 941 and an atmosphere in the recovery tank 92*a* to perform application or interrupt the application of the pressure P2 generated in the pressure tank 941 to the recovery tank 92*a*. Specifically, as shown in FIG. 4, when the solenoid valve Vg2 is opened, an atmosphere in the pressure tank 941 and an atmosphere in the recovery tank 92*a* communicate with each other to apply the pressure P2 from the pressure tank 941 to the recovery tank 92*a* through the tube 943 and the pressure transmission pipe 944. On the other hand, when the solenoid valve Vg2 is closed, the communication between an atmosphere in the pressure tank 941 and an atmosphere in the recovery tank 92*a* is interrupted to stop supply of the pressure P2 from the pressure tank 941 to the recovery tank 92*a*. As shown in FIG. 4, the solenoid valve Vg2 is opened to provide communication between an atmosphere in the pressure tank 941 and an atmosphere in the recovery tank 92*a* when energized. On the other hand, the solenoid valve Vg2 is closed to interrupt the communication between an atmosphere in the pressure tank 941 and an atmosphere in the recovery tank 92*a* when de-energized.

At the ink recovery mechanism 9*b*, a stop filter 945 is interposed in the pressure transmission pipe 944. The stop filter 945 prohibits passage of the ink from the recovery tank 92*a* toward the pressure tank 941 while allowing passage of gas from the recovery tank 92*a* toward the pressure tank 941. In this way, the stop filter 945 prevents the ink from flowing from the recovery tank 92*a* into the tube 943.

A communication pipe 900 is further provided between the recovery tank 92*a* and the supply tank 91*a* connected in such a manner as to allow communication between an atmosphere in the recovery tank 92*a* and an atmosphere in the supply tank 91*a*. A solenoid valve Vg0 is interposed in the communication pipe 900 for providing communication or interrupting the communication between an atmosphere in the recovery tank 92*a* and an atmosphere in the supply tank 91*a*. Specifically, as shown in FIG. 4, when the solenoid valve Vg0 is closed, the communication between an atmosphere in the supply tank 91*a* and an atmosphere in the recovery tank 92*a* is interrupted so the pressure P1 in the supply tank 91*a* and the pressure P2 in the recovery tank 92*a* become independent of each other. On the other hand, when the solenoid valve Vg0 is opened, the communication is provided between an atmosphere in the supply tank 91*a* and an atmosphere in the recovery tank 92*a* so respective internal pressures in the supply tank 91*a* and the recovery tank 92*a* become equal to each other. As shown in FIG. 4, the solenoid valve Vg0 is closed to interrupt the communication between an atmosphere in the supply tank 91*a* and an atmosphere in the recovery tank 92*a* when energized. On the other hand, the solenoid valve Vg0 is opened to provide the communication between an atmosphere in the supply tank 91*a* and an atmosphere in the recovery tank 92*a* when de-energized.

In the state shown in FIG. 4, the pressure P2 applied by the pressure generator 94 to the recovery tank 92*a* through the tube 943, the solenoid valve Vg2, and the pressure transmission pipe 944 is lower than the pressure P1 applied by the pressure generator 93 to the supply tank 91*a* through the tube 933 and the solenoid valve Vg1. As a result of this difference between the pressure P2 and the pressure P1, the ink is fed along a supply and recovery path Cb1 along which the ink flows from the supply tank 91*a* into the ink supply chamber Hc of the ejection head H through the supply pipe 91*b* and then the ink reaches the recovery tank 92*a* from the ink supply chamber Hc of the ejection head H through the recovery pipe 92*b*. The ink having been fed to the recovery tank 92*a* along the supply and recovery path Cb1 is returned by the circulation pump 902 to the supply tank 91*a* along the return path Ca1. In this way, the ink is circulated along a circulation path Cc1 (including the return path Ca1 and the supply and recovery path Cb1) along which the ink returns to the supply tank 91*a* after starting from the supply tank 91*a* and reaching the recovery tank 92*a* via the ejection head H.

Figure 5:
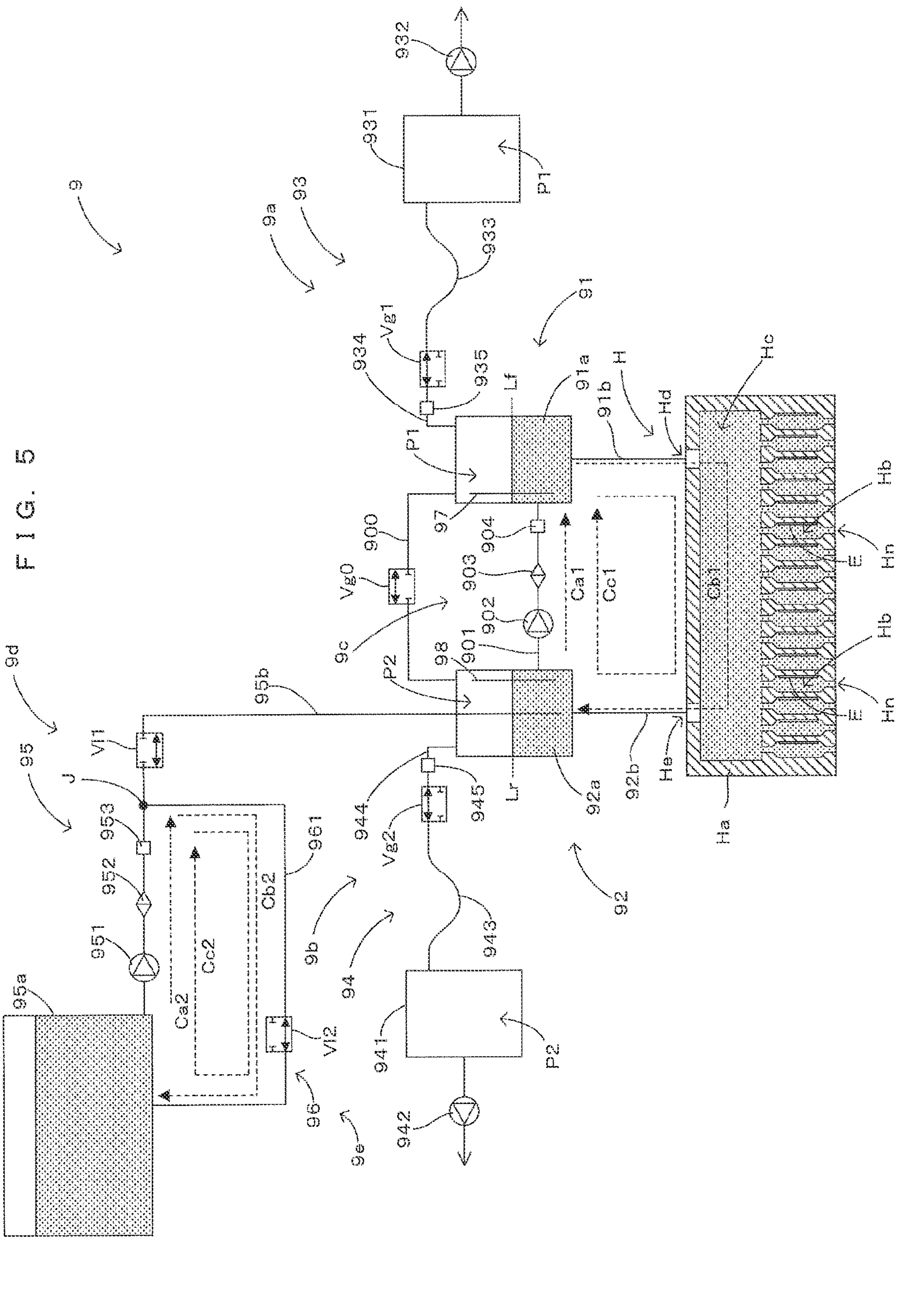
FIG. 5 schematically shows the configuration of the ejection head and the configuration of the ink supply, recovery, replenishing, and circulation mechanism 9 for supplying, recovering, replenishing, and circulating ink for the ejection head.

As described above, the ink supply, recovery, replenishing, and circulation mechanism 9 includes the ink replenishing mechanism 9*d* and the ink return mechanism 9*e*. The ink replenishing mechanism 9*d* and the ink return mechanism 9*e* will be described next by referring further to FIG. 5. Like FIG. 4, FIG. 5 schematically shows the configuration of the ejection head and the configuration of the ink supply, recovery, replenishing, and circulation mechanism 9 for supplying, recovering, replenishing, and circulating ink for the ejection head. Meanwhile, a solenoid valve in each of the ink replenishing mechanism 9*d* and the ink return mechanism 9*e* is in a state differing between FIGS. 4 and 5.

The ink replenishing mechanism 9*d* includes an ink replenisher 95 that replenishes the recovery tank 92*a* of the ink recovery mechanism 9*b* with the ink. The ink replenisher 95 includes a buffer tank 95*a* storing the ink to be replenished into the recovery tank 92*a*. The buffer tank 95*a* is configured to store a larger amount of the ink than the supply tank 91*a* and the recovery tank 92*a*.

The ink replenisher 95 further includes a replenishing pipe 95*b* forming flow path connection between the buffer tank 95*a* and the recovery tank 92*a* and feeding the ink from the buffer tank 95*a* to the recovery tank 92*a*, a replenishing pump 951 interposed into a position along the replenishing pipe 95*b* and arranged between the buffer tank 95*a* and the recovery tank 92*a*, and a replenishing solenoid valve Vl1 interposed into a position along the replenishing pipe 95*b* and arranged between the replenishing pump 951 and the recovery tank 92*a*. The replenishing pump 951 feeds the ink from the buffer tank 95*a* toward the recovery tank 92*a* along the replenishing pipe 95*b*. Meanwhile, opening the replenishing solenoid valve Vl1 as shown in FIG. 4 allows feeding of the ink from the buffer tank 95*a* to the recovery tank 92*a* through the replenishing pipe 95*b* using the replenishing pump 951. On the other hand, closing the replenishing solenoid valve Vl1 as shown in FIG. 5 interrupts feeding of the ink from the buffer tank 95*a* to the recovery tank 92*a* through the replenishing pipe 95*b* using the replenishing pump 951.

The ink replenisher 95 includes a filter 952 interposed into a position along the replenishing pipe 95*b* and arranged between the replenishing pump 951 and the replenishing solenoid valve Vl1, and a degasser 953 interposed into a position along the replenishing pipe 95*b* and arranged between the filter 952 and the replenishing solenoid valve Vl1. The filter 952 removes a foreign matter from the ink after flowing out of the replenishing pump 951 and before flowing into the degasser 953. The degasser 953 performs degassing on the ink after flowing out of the filter 952 and before flowing into the replenishing solenoid valve Vl1.

The ink return mechanism 9*e* includes an ink return part 96. The ink return part 96 includes a return pipe 961 forming flow path connection between a branch point J provided at a position along the replenishing pipe 95*b* and the buffer tank 95*a* and feeding the ink from the branch point J to the buffer tank 95*a*. The branch point J is provided in the replenishing pipe 95*b* and arranged at a position between the replenishing pump 951 and the replenishing solenoid valve Vl1, more specifically, at a position between the degasser 953 and the replenishing solenoid valve Vl1. The ink return part 96 includes a return solenoid valve Vl2 interposed into a position along the return pipe 961 and arranged between the branch point J and the buffer tank 95*a*. Opening the return solenoid valve Vl2 as shown in FIG. 5 allows feeding of the ink from the branch point J to the buffer tank 95*a* through the return pipe 961. On the other hand, closing the return solenoid valve Vl2 as shown in FIG. 4 interrupts feeding of the ink from the branch point J to the buffer tank 95*a* through the return pipe 961.

As shown in FIG. 4, in this configuration, by opening the replenishing solenoid valve Vl1 and closing the return solenoid valve Vl2 and by feeding the ink from the buffer tank 95*a* to the recovery tank 92*a* through the replenishing pipe 95*b* using the replenishing pump 951, the ink is replenished into the recovery tank 92*a* along a replenishing path Cs along which the ink from the buffer tank 95*a* reaches the recovery tank 92*a* via the replenishing solenoid valve Vl1. On the other hand, as shown in FIG. 5, by closing the replenishing solenoid valve Vl1 and opening the return solenoid valve Vl2 and by feeding the ink from the buffer tank 95*a* to the branch point J using the replenishing pump 951, the ink having been fed through the replenishing pipe 95*b* along a feed path Ca2 from the buffer tank 95*a* to the branch point J branches off at the branch point J from the replenishing pipe 95*b* into the return pipe 961. The ink branching off into the return pipe 961 is fed through the return pipe 961 to return to the buffer tank 95*a* along a return path Cb2 along which the ink from the branch point J reaches the buffer tank 95*a* via the return solenoid valve Vl2. Specifically, the ink is circulated along a circulation path Cc2 (including the feed path Ca2 and the return path Cb2) along which the ink from the buffer tank 95*a* reaches the branch point J in the replenishing pipe 95*b* and then returns from the branch point J to the buffer tank 95*a* through the return pipe 961.

The ink supply, recovery, replenishing, and circulation mechanism 9 includes a supply liquid level detector 97 that detects a liquid level Lf (supply liquid level) of the ink stored in the supply tank 91*a*, and a recovery liquid level detector 98 that detects a liquid level Lr (recovery liquid level) of the ink stored in the recovery tank 92*a*. As described next, the operations of the replenishing solenoid valve Vl1, the return solenoid valve Vl2, and the circulation pump 902 are controlled on the basis of the liquid level Lf of the ink in the supply tank 91*a* detected by the supply liquid level detector 97 and the liquid level Lr of the ink in the recovery tank 92*a* detected by the recovery liquid level detector 98.

Figure 6:
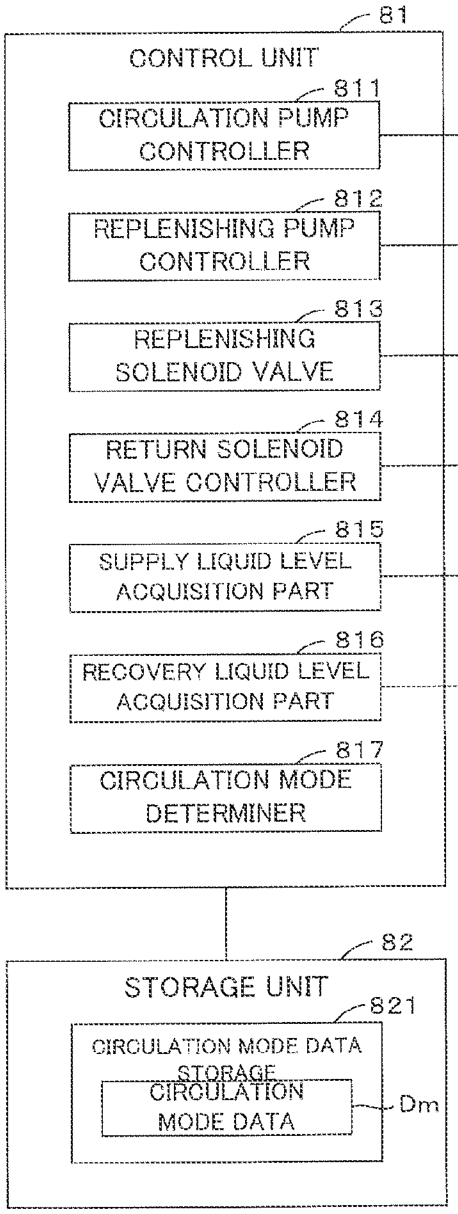
FIG. 6 is a block diagram showing an electrical configuration of the printing apparatus.

FIG. 6 is a block diagram showing an electrical configuration of the printing apparatus. As shown in FIG. 6, the printing apparatus 3 includes a control unit 81 and a storage unit 82. The control unit 81 has a central processing unit (CPU) or a field-programmable gate array (FPGA). The control unit 81 includes a circulation pump controller 811, a replenishing pump controller 812, a replenishing solenoid valve controller 813, a return solenoid valve controller 814, a supply liquid level acquisition part 815, a recovery liquid level acquisition part 816, and a circulation mode determiner 817. If the control unit 81 is a processor such as a CPU, the control unit 81 executes a predetermined program to develop control relating to each of these functional parts 811 to 819 in the control unit 81. If the control unit 81 is an FPGA, a logic circuit to fulfill the function of each of these functional parts 811 to 819 is mounted on the FPGA.

The circulation pump controller 811 controls the circulation pump 902. Specifically, the circulation pump 902 starts, increases output, reduces output, or stops on the basis of control by the circulation pump controller 811. The replenishing pump controller 812 controls the replenishing pump 951. Specifically, the replenishing pump 951 starts, increases output, reduces output, or stops on the basis of control by the replenishing pump controller 812. The replenishing solenoid valve controller 813 controls the replenishing solenoid valve Vl1. Specifically, the replenishing solenoid valve Vl1 is opened or closed on the basis of control by the replenishing solenoid valve controller 813. The return solenoid valve controller 814 controls the return solenoid valve Vl2. Specifically, the return solenoid valve Vl2 is opened or closed on the basis of control by the return solenoid valve controller 814.

Figure 7:
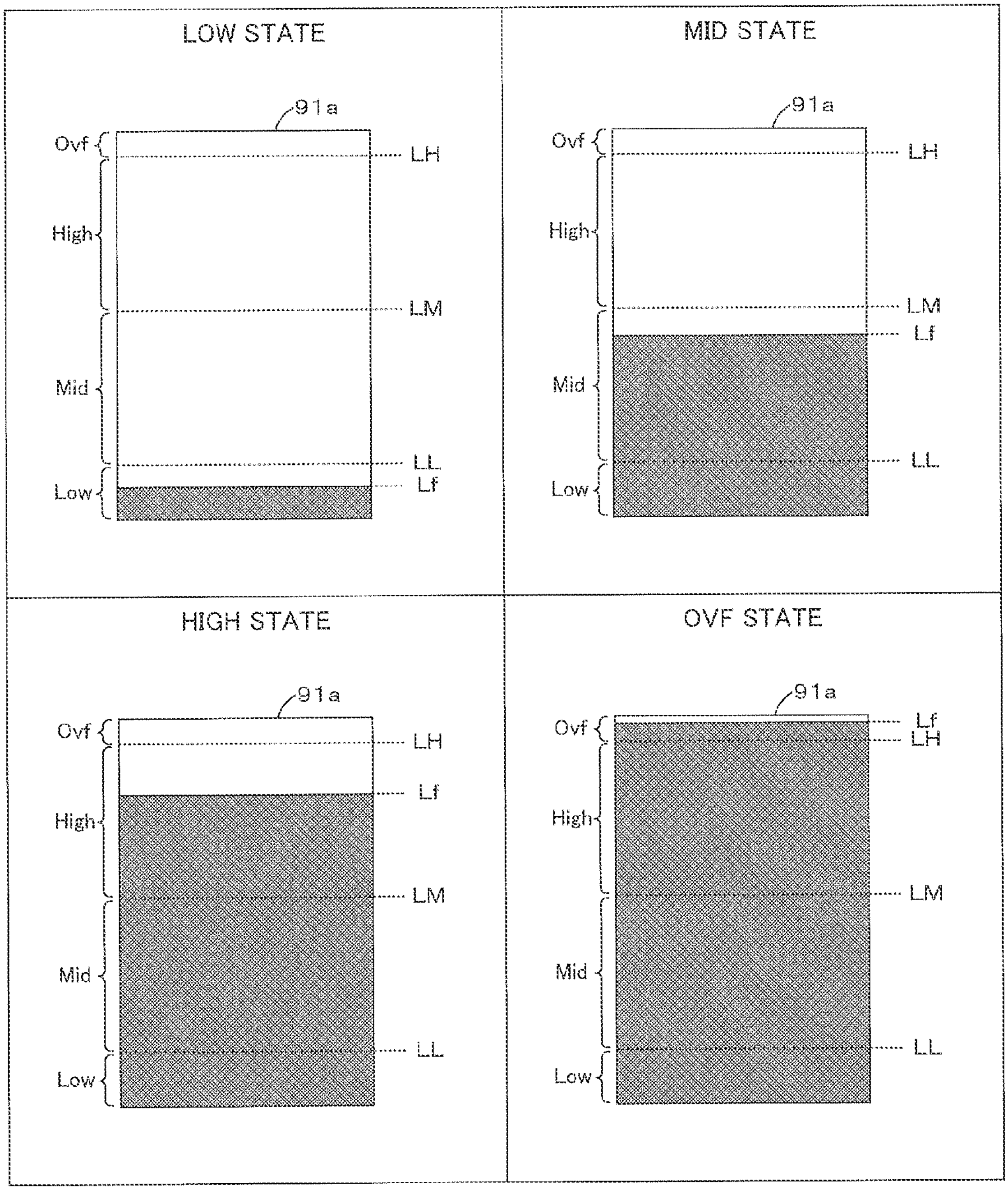
FIG. 7 schematically shows a way of detecting a liquid level of the ink.

The supply liquid level acquisition part 815 acquires the liquid level Lf of the ink in the supply tank 91*a* detected by the supply liquid level detector 97. The recovery liquid level acquisition part 816 acquires the liquid level Lr of the ink in the recovery tank 92*a* detected by the recovery liquid level detector 98. As shown in FIG. 7, the supply liquid level detector 97 and the recovery liquid level detector 98 detect the ink liquid level Lf and the ink liquid level Lr respectively on a scale of four levels.

FIG. 7 schematically shows a way of detecting a liquid level of the ink. The supply liquid level detector 97 and the recovery liquid level detector 98 detect a liquid level of the ink in a common way. Thus, the description herein is about a way in which the supply liquid level detector 97 detects the liquid level Lf of the ink in the supply tank 91*a*. The supply liquid level detector 97 includes three float sensors for detecting the presence or absence of the ink in the supply tank 91*a* at respective heights LL, LM, and LH differing from each other. Specifically, the supply liquid level detector 97 detects a range of presence of the liquid level Lf of the ink in the supply tank 91*a* on the basis of the presence or absence of the ink at a first height LL, at a second height LM higher than the first height LL, and at a third height LH higher than the second height LM.

The following describes a specific relationship between the presence or absence of the ink at each of the first height LL, the second height LM, and the third height LH with a range of presence of the liquid level Lf of the ink. More specifically, as shown in a section “Low state” in FIG. 7, if the ink is not present at any of the first height LL, the second height LM, and the third height LH, the liquid level Lf of the ink in the supply tank 91*a* is present in a range Low of less than the first height LL. As shown in a section “Mid state” in FIG. 7, if the ink is present at the first height LL and is not present at the second height LM and at the third height LH, the liquid level Lf of the ink in the supply tank 91*a* is present in a range Mid of equal to or higher than the first height LL and less than the second height LM. As shown in a section “High state” in FIG. 7, if the ink is present at the first height LL and at the second height LM and is not present at the third height LH, the liquid level Lf of the ink in the supply tank 91*a* is present in a range High of equal to or higher than the second height LM and less than the third height LH. As shown in a section "Ovf state" in FIG. 7, if the ink is present at any of the first height LL, the second height LM, and the third height LH, the liquid level Lf of the ink in the supply tank 91*a* is present in a range Ovf of equal to or higher than the third height LH.

The circulation mode determiner 817 (FIG. 6) controls a circulation mode of causing the ink supply, recovery, replenishing, and circulation mechanism 9 to feed the ink on the basis of the liquid level Lf of the ink in the supply tank 91*a* acquired by the supply liquid level acquisition part 815 from the supply liquid level detector 97 and the liquid level Lr of the ink in the recovery tank 92*a* acquired by the recovery liquid level acquisition part 816 from the recovery liquid level detector 98.

Figure 8:
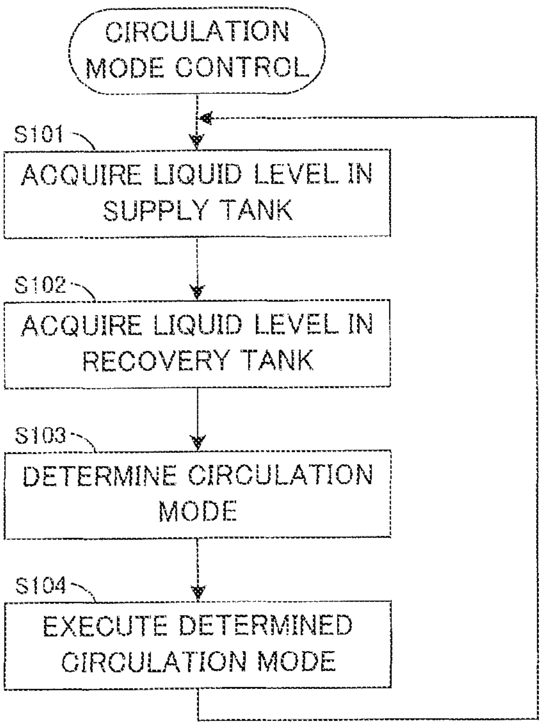
FIG. 8 is a flowchart showing an example of circulation mode control performed by the control unit.

FIG. 8 is a flowchart showing an example of circulation mode control performed by the control unit. FIG. 9 shows an example of circulation mode data in a table format referred to in performing the circulation mode control shown in FIG. 8. Circulation mode data Dm in FIG. 9 is stored in advance in a circulation mode data storage 821 of the storage unit 82. The circulation mode determiner 817 reads the circulation mode data Dm from the circulation mode data storage 821 of the storage unit 82 and refers to the read circulation mode data Dm.

In step S101 of the circulation mode control shown in FIG. 8, the supply liquid level acquisition part 815 acquires the liquid level Lf of the ink in the supply tank 91*a* from the supply liquid level detector 97. In step S102, the recovery liquid level acquisition part 816 acquires the liquid level Lr of the ink in the recovery tank 92*a* from the recovery liquid level detector 98. Order in which steps S101 and S102 are performed is not limited to the one described in this example but these steps may be performed in reverse order or may be performed simultaneously.

In step S103, the circulation mode determiner 817 determines a circulation mode on the basis of a combination between the liquid level Lf of the ink in the supply tank 91*a* acquired by the supply liquid level acquisition part 815 and the liquid level Lr of the ink in the recovery tank 92*a* acquired by the recovery liquid level acquisition part 816, and the circulation mode data Dm. As shown in FIG. 9, the circulation mode data Dm defines the operations of the circulation pump 902, the replenishing solenoid valve Vl1, and the return solenoid valve Vl2 in each of circulation modes 1 to 11.

As shown in FIG. 9, if the liquid level Lf of the ink in the supply tank 91*a* is in the range Low and if the liquid level Lr of the ink in the recovery tank 92*a* is in the range Low, the circulation mode determiner 817 determines to execute a circulation mode 1. In the circulation mode 1, the circulation pump controller 811 controls the circulation pump 902 in such a manner as to maintain output from the circulation pump 902, the replenishing solenoid valve controller 813 controls the replenishing solenoid valve Vl1 in such a manner as to open the replenishing solenoid valve Vl1, and the return solenoid valve controller 814 controls the return solenoid valve Vl2 in such a manner as to close the return solenoid valve Vl2. Specifically, as shown in FIG. 4, the ink is replenished from the buffer tank 95*a* into the recovery tank 92*a* along the replenishing path Cs along which the ink from the buffer tank 95*a* reaches the recovery tank 92*a* via the replenishing solenoid valve Vl1.

As shown in FIG. 9, if the liquid level Lf of the ink in the supply tank 91*a* is in the range Low and if the liquid level Lr of the ink in the recovery tank 92*a* is in the range Mid, the circulation mode determiner 817 determines to execute a circulation mode 2. In the circulation mode 2, the circulation pump controller 811 controls the circulation pump 902 in such a manner as to increase output from the circulation pump 902, the replenishing solenoid valve controller 813 controls the replenishing solenoid valve Vl1 in such a manner as to open the replenishing solenoid valve Vl1, and the return solenoid valve controller 814 controls the return solenoid valve Vl2 in such a manner as to close the return solenoid valve Vl2. Specifically, as shown in FIG. 4, the ink is replenished from the buffer tank 95*a* into the recovery tank 92*a* along the replenishing path Cs. Furthermore, increasing the output from the circulation pump 902 increases the amount of the ink fed from the recovery tank 92*a* to the supply tank 91*a*.

As shown in FIG. 9, if the liquid level Lf of the ink in the supply tank 91*a* is in the range Low and if the liquid level Lr of the ink in the recovery tank 92*a* is in the range High, the circulation mode determiner 817 determines to execute a circulation mode 3. In the circulation mode 3, the circulation pump controller 811 controls the circulation pump 902 in such a manner as to increase output from the circulation pump 902, the replenishing solenoid valve controller 813 controls the replenishing solenoid valve Vl1 in such a manner as to close the replenishing solenoid valve Vl1, and the return solenoid valve controller 814 controls the return solenoid valve Vl2 in such a manner as to open the return solenoid valve Vl2. Specifically, as shown in FIG. 5, the ink is circulated along the circulation path Cc2 along which the ink is fed from the buffer tank 95*a* to the branch point J through the replenishing pipe 95*b*, branches off into the return pipe 961, and is then returned to the buffer tank 95*a* through the return pipe 961 via the return solenoid valve Vl2. Furthermore, increasing the output from the circulation pump 902 increases the amount of the ink fed from the recovery tank 92*a* to the supply tank 91*a*.

As shown in FIG. 9, if the liquid level Lf of the ink in the supply tank 91*a* is in the range Mid and if the liquid level Lr of the ink in the recovery tank 92*a* is in the range Low, the circulation mode determiner 817 determines to execute a circulation mode 4. In the circulation mode 4, the circulation pump controller 811 controls the circulation pump 902 in such a manner as to reduce output from the circulation pump 902, the replenishing solenoid valve controller 813 controls the replenishing solenoid valve Vl1 in such a manner as to open the replenishing solenoid valve Vl1, and the return solenoid valve controller 814 controls the return solenoid valve Vl2 in such a manner as to close the return solenoid valve Vl2. Specifically, as shown in FIG. 4, the ink is replenished from the buffer tank 95*a* into the recovery tank 92*a* along the replenishing path Cs. Furthermore, reducing the output from the circulation pump 902 reduces the amount of the ink fed from the recovery tank 92*a* to the supply tank 91*a*.

As shown in FIG. 9, if the liquid level Lf of the ink in the supply tank 91*a* is in the range Mid and if the liquid level Lr of the ink in the recovery tank 92*a* is in the range Mid, the circulation mode determiner 817 determines to execute a circulation mode 5. In the circulation mode 5, the circulation pump controller 811 controls the circulation pump 902 in such a manner as to maintain output from the circulation pump 902, the replenishing solenoid valve controller 813 controls the replenishing solenoid valve Vl1 in such a manner as to close the replenishing solenoid valve Vl1, and the return solenoid valve controller 814 controls the return solenoid valve Vl2 in such a manner as to open the return solenoid valve Vl2. Specifically, as shown in FIG. 5, the ink is circulated along the circulation path Cc2 along which the ink is fed from the buffer tank 95*a* to the branch point J through the replenishing pipe 95*b*, branches off into the return pipe 961, and is then returned to the buffer tank 95*a* through the return pipe 961 via the return solenoid valve Vl2.

As shown in FIG. 9, if the liquid level Lf of the ink in the supply tank 91*a* is in the range Mid and if the liquid level Lr of the ink in the recovery tank 92*a* is in the range High, the circulation mode determiner 817 determines to execute a circulation mode 6. In the circulation mode 6, the circulation pump controller 811 controls the circulation pump 902 in such a manner as to increase output from the circulation pump 902, the replenishing solenoid valve controller 813 controls the replenishing solenoid valve Vl1 in such a manner as to close the replenishing solenoid valve Vl1, and the return solenoid valve controller 814 controls the return solenoid valve Vl2 in such a manner as to open the return solenoid valve Vl2. Specifically, as shown in FIG. 5, the ink is circulated along the circulation path Cc2. Furthermore, increasing the output from the circulation pump 902 increases the amount of the ink fed from the recovery tank 92*a* to the supply tank 91*a*.

As shown in FIG. 9, if the liquid level Lf of the ink in the supply tank 91*a* is in the range High and if the liquid level Lr of the ink in the recovery tank 92*a* is in the range Low, the circulation mode determiner 817 determines to execute a circulation mode 7. In the circulation mode 7, the circulation pump controller 811 controls the circulation pump 902 in such a manner as to reduce output from the circulation pump 902, the replenishing solenoid valve controller 813 controls the replenishing solenoid valve Vl1 in such a manner as to close the replenishing solenoid valve Vl1, and the return solenoid valve controller 814 controls the return solenoid valve Vl2 in such a manner as to open the return solenoid valve Vl2. Specifically, as shown in FIG. 5, the ink is circulated along the circulation path Cc2. Furthermore, reducing the output from the circulation pump 902 reduces the amount of the ink fed from the recovery tank 92*a* to the supply tank 91*a*.

As shown in FIG. 9, if the liquid level Lf of the ink in the supply tank 91*a* is in the range High and if the liquid level Lr of the ink in the recovery tank 92*a* is in the range Mid, the circulation mode determiner 817 determines to execute a circulation mode 8. In the circulation mode 8, the circulation pump controller 811 controls the circulation pump 902 in such a manner as to reduce output from the circulation pump 902, the replenishing solenoid valve controller 813 controls the replenishing solenoid valve Vl1 in such a manner as to close the replenishing solenoid valve Vl1, and the return solenoid valve controller 814 controls the return solenoid valve Vl2 in such a manner as to open the return solenoid valve Vl2. Specifically, as shown in FIG. 5, the ink is circulated along the above-described circulation path Cc2. Furthermore, reducing the output from the circulation pump 902 reduces the amount of the ink fed from the recovery tank 92*a* to the supply tank 91*a*.

As shown in FIG. 9, if the liquid level Lf of the ink in the supply tank 91*a* is in the range High and if the liquid level Lr of the ink in the recovery tank 92*a* is in the range High, the circulation mode determiner 817 determines to execute a circulation mode 9. In the circulation mode 9, the circulation pump controller 811 controls the circulation pump 902 in such a manner as to stop the circulation pump 902, the replenishing solenoid valve controller 813 controls the replenishing solenoid valve Vl1 in such a manner as to close the replenishing solenoid valve Vl1, and the return solenoid valve controller 814 controls the return solenoid valve Vl2 in such a manner as to open the return solenoid valve Vl2. Specifically, as shown in FIG. 5, the ink is circulated along the circulation path Cc2. Furthermore, stopping the circulation pump 902 stops feeding of the ink from the recovery tank 92*a* to the supply tank 91*a*.

As shown in FIG. 9, if the liquid level Lf of the ink in the supply tank 91*a* is in the range Ovf, the circulation mode determiner 817 determines to execute a circulation mode 10. In the circulation mode 10, the circulation pump controller 811 controls the circulation pump 902 in such a manner as to stop the circulation pump 902, the replenishing solenoid valve controller 813 controls the replenishing solenoid valve Vl1 in such a manner as to close the replenishing solenoid valve Vl1, and the return solenoid valve controller 814 controls the return solenoid valve Vl2 in such a manner as to open the return solenoid valve Vl2. Specifically, the circulation of the ink along the circulation path Cc1 is stopped and the ink is circulated along the circulation path Cc2.

As shown in FIG. 9, if the liquid level Lr of the ink in the recovery tank 92*a* is in the range Ovf, the circulation mode determiner 817 determines to execute a circulation mode 11. In the circulation mode 11, the circulation pump controller 811 controls the circulation pump 902 in such a manner as to stop the circulation pump 902, the replenishing solenoid valve controller 813 controls the replenishing solenoid valve Vl1 in such a manner as to close the replenishing solenoid valve Vl1, and the return solenoid valve controller 814 controls the return solenoid valve Vl2 in such a manner as to open the return solenoid valve Vl2. Specifically, the circulation of the ink along the circulation path Cc1 is stopped and the ink is circulated along the circulation path Cc2.

In step S104 in the flowchart of FIG. 8, the circulation mode determined in the above-described way in step S103 is executed.

According to the embodiment described above, the ink is circulated along the circulation path Cc1 (first circulation path) along which the ink is fed from the recovery tank 92*a* to the supply tank 91*a* through the return pipe 901 (first return pipe), is then fed to the ejection head H through the supply pipe 91*b*, and is further fed from the ejection head H to the recovery tank 92*a* through the recovery pipe 92*b* (first circulation step). This reduces settling of a component of the ink stored in each of the supply tank 91*a* and the recovery tank 92*a*. The replenishing pump 951 is attached to the replenishing pipe 95*b* forming connection between the buffer tank 95*a* and the recovery tank 92*a*. Thus, when the ink is consumed by ejection of the ink from the ejection head H, the ink can be replenished from the buffer tank 95*a* into the recovery tank 92*a* through the replenishing pipe 95*b* using the replenishing pump 951 (replenishing step).

In particular, according to the present embodiment, the return pipe 961 (second return pipe) is provided that forms flow path connection of the branch point J provided in the replenishing pipe 95*b* and arranged between the replenishing pump 951 and the recovery tank 92*a* to the buffer tank 95*a*. Furthermore, the replenishing pipe 95*b* is provided with the replenishing solenoid valve Vl1 (first solenoid valve) arranged between the branch point J and the recovery tank 92*a*. The return pipe 961 is provided with the return solenoid valve Vl2 (second solenoid valve) arranged between the branch point J and the buffer tank 95*a*. Opening the replenishing solenoid valve Vl1 allows feeding of the ink from the buffer tank 95*a* to the recovery tank 92*a* through the replenishing pipe 95*b* using the replenishing pump 951.

Closing the replenishing solenoid valve Vl1 interrupts feeding of the ink from the buffer tank 95*a* to the recovery tank 92*a* through the replenishing pipe 95*b* using the replenishing pump 951. Opening the return solenoid valve Vl2 allows feeding of the ink from the branch point J to the buffer tank 95*a* through the return pipe 961. Closing the return solenoid valve Vl2 interrupts feeding of the ink from the branch point J to the buffer tank 95*a* through the return pipe 961. Thus, opening the replenishing solenoid valve Vl1 and closing the return solenoid valve Vl2 allows the ink fed using the replenishing pump 951 to pass through the replenishing solenoid valve Vl1 and prohibits passage of this ink through the return solenoid valve Vl2. By doing so, the replenishing pump 951 becomes capable of replenishing the ink from the buffer tank 95*a* into the recovery tank 92*a* via the replenishing solenoid valve Vl1 as described above. Meanwhile, closing the replenishing solenoid valve Vl1 and opening the return solenoid valve Vl2 prohibits passage of the ink fed using the replenishing pump 951 through the replenishing solenoid valve Vl1 and allows this ink to pass through the return solenoid valve Vl2. In this way, the ink is circulated along the circulation path Cc2 (second circulation path) along which the ink is fed from the buffer tank 95*a* to the branch point J though the replenishing pipe 95*b* and then fed from the branch point J to the buffer tank 95*a* through the return pipe 961 (second circulation step). As a result, settling of a component of the ink is reduced in the buffer tank 95*a* storing the ink to be replenished into the ejection head H.

Additionally, according to the present embodiment, the replenishing pump 951 is responsible for both the operation of replenishing the ink from the buffer tank 95*a* into the recovery tank 92*a* and the operation of circulating the ink along the circulation path Cc2. This achieves further effect of reducing the number of pumps compared to a configuration of providing two pumps for the respective operations.

The supply liquid level detector 97 is provided to the supply tank 91*a* for detecting the liquid level Lf (supply liquid level) of the ink in the supply tank 91*a*, and the recovery liquid level detector 98 is provided to the recovery tank 92*a* for detecting the liquid level Lr (recovery liquid level) of the ink in the recovery tank 92*a*. The control unit 81 further includes the supply liquid level acquisition part 815 that acquires the liquid level Lf of the ink detected by the supply liquid level detector 97, and the recovery liquid level acquisition part 816 that acquires the liquid level Lr of the ink detected by the recovery liquid level detector 98. The replenishing solenoid valve controller 813 (first solenoid valve controller) controls opening and closing of the replenishing solenoid valve Vl1 on the basis of the liquid level Lf of the ink detected by the supply liquid level detector 97 and the liquid level Lr of the ink detected by the recovery liquid level detector 98. The return solenoid valve controller 814 (second solenoid valve controller) controls opening and closing of the return solenoid valve Vl2 on the basis of the liquid level Lf of the ink detected by the supply liquid level detector 97 and the liquid level Lr of the ink detected by the recovery liquid level detector 98. This configuration achieves replenishing of the ink into the recovery tank 92*a* or circulation of the ink along the circulation path Cc2 in response to the liquid level Lf of the ink in the supply tank 91*a* and the liquid level Lr of the ink in the recovery tank 92*a*.

The supply liquid level detector 97 at least determines whether the liquid level Lf of the ink in the supply tank 91*a* is in the range Low (first supply liquid level range) that is less than the first height LL (first supply threshold), in the range Mid (second supply liquid level range) that is less than the second height LM (second supply threshold) higher than the first height LL and is equal to or higher than the first height LL, or in the range High (third supply liquid level range) that is less than the third height LH (third supply threshold) higher than the second height LM and is equal to or higher than the second height LM. The recovery liquid level detector 98 at least determines whether the liquid level Lr of the ink in the recovery tank 92*a* is in the range Low (first recovery liquid level range) that is less than the first height LL (first recovery threshold), in the range Mid (second recovery liquid level range) that is less than the second height LM (second recovery threshold) higher than the first height LL and is equal to or higher than the first height LL, or in the range High (third recovery liquid level range) that is less than the third height LH (third recovery threshold) higher than the second height LM and is equal to or higher than the second height LM. This configuration achieves replenishing of the ink into the recovery tank 92*a* or circulation of the ink along the circulation path Cc2 in response to result of detection of each of the liquid level Lf of the ink in the supply tank 91*a* and the liquid level Lr of the ink in the recovery tank 92*a* on a scale of at least three levels.

If the liquid level Lf of the ink acquired by the supply liquid level acquisition part 815 is in the range Mid and if the liquid level Lr of the ink acquired by the recovery liquid level acquisition part 816 is in the range Mid or in the range High (circulation mode 5 or 6), the replenishing solenoid valve controller 813 controls the replenishing solenoid valve Vl1 in such a manner as to close the replenishing solenoid valve Vl1 and the return solenoid valve controller 814 controls the return solenoid valve Vl2 in such a manner as to open the return solenoid valve Vl2 to circulate the ink along the circulation path Cc2. In this configuration, by taking advantage of timing of when the amount of the ink is large in each of the supply tank 91*a* and the recovery tank 92*a*, settling of the ink in the buffer tank 95*a* can be reduced by circulating the ink along the circulation path Cc2.

In this case, if the liquid level Lf of the ink acquired by the supply liquid level acquisition part 815 is in the range Mid and if the liquid level Lr of the ink acquired by the recovery liquid level acquisition part 816 is in the range High (circulation mode 6), the circulation pump controller 811 controls the circulation pump 902 in such a manner as to increase output from the circulation pump 902 in feeding the ink. In this configuration, the amount of the ink fed from the recovery tank 92*a* to the supply tank 91*a* using the circulation pump 902 is increased, making it possible to prevent excess of the ink in the recovery tank 92*a*.

If the liquid level Lf of the ink acquired by the supply liquid level acquisition part 815 is in the range High (circulation mode 7, 8, or 9), the replenishing solenoid valve controller 813 controls the replenishing solenoid valve Vl1 in such a manner as to close the replenishing solenoid valve Vl1 and the return solenoid valve controller 814 controls the return solenoid valve Vl2 in such a manner as to open the return solenoid valve Vl2 to circulate the ink along the circulation path Cc2. In this configuration, by taking advantage of timing of when the amount of the ink is large in the supply tank 91*a*, settling of the ink in the buffer tank 95*a* can be reduced by circulating the ink along the circulation path Cc2.

In this case, if the liquid level Lf of the ink acquired by the supply liquid level acquisition part 815 is in the range High and if the liquid level Lr of the ink acquired by the recovery liquid level acquisition part 816 is in the range Low or in the range Mid (circulation mode 7 or 8), the circulation pump controller 811 controls the circulation pump 902 in such a manner as to reduce output from the circulation pump 902 in feeding the ink. In this configuration, the amount of the ink fed from the recovery tank 92*a* to the supply tank 91*a* using the circulation pump 902 is reduced, making it possible to prevent excess of the ink in the supply tank 91*a*.

In another case, if the liquid level Lf of the ink acquired by the supply liquid level acquisition part 815 is in the range High and if the liquid level Lr of the ink acquired by the recovery liquid level acquisition part 816 is in the range High (circulation mode 9), the circulation pump controller 811 controls the circulation pump 902 in such a manner as to stop the circulation pump 902. In this configuration, feeding of the ink from the recovery tank 92*a* to the supply tank 91*a* using the circulation pump 902 is stopped, making it possible to prevent excess of the ink in the supply tank 91*a*.

If the liquid level Lf of the ink acquired by the supply liquid level acquisition part 815 is in the range Low and if the liquid level Lr of the ink acquired by the recovery liquid level acquisition part 816 is in the range Low or in the range Mid (circulation mode 1 or 2), the replenishing solenoid valve controller 813 controls the replenishing solenoid valve Vl1 in such a manner as to open the replenishing solenoid valve Vl1 and the return solenoid valve controller 814 controls the return solenoid valve Vl2 in such a manner as to close the return solenoid valve Vl2 to feed the ink to the buffer tank 95*a* along the replenishing path Cs. In this configuration, the ink is replenished from the buffer tank 95*a* into the supply tank 91*a* in response to reduction in the amount of the ink in the supply tank 91*a*. The ink thereby replenished into the recovery tank 92*a* is fed from the recovery tank 92*a* to the supply tank 91*a* using the circulation pump 902. As a result, it is possible to resolve shortage of the ink in the supply tank 91*a*.

In this case, if the liquid level Lf of the ink acquired by the supply liquid level acquisition part 815 is in the range Low and if the liquid level Lr of the ink acquired by the recovery liquid level acquisition part 816 is in the range Mid (circulation mode 2), the circulation pump controller 811 controls the circulation pump 902 in such a manner as to increase output from the circulation pump 902 in feeding the ink. In this configuration, the amount of the ink fed from the recovery tank 92*a* to the supply tank 91*a* using the circulation pump 902 is increased, making it possible to resolve shortage of the ink in the supply tank 91*a*.

If the liquid level Lf of the ink acquired by the supply liquid level acquisition part 815 is in the range Mid and if the liquid level Lr of the ink acquired by the recovery liquid level acquisition part 816 is in the range Low (circulation mode 4), the replenishing solenoid valve controller 813 controls the replenishing solenoid valve Vl1 in such a manner as to open the replenishing solenoid valve Vl1 and the return solenoid valve controller 814 controls the return solenoid valve Vl2 in such a manner as to close the return solenoid valve Vl2 to circulate the ink along the circulation path Cc1. In this configuration, the ink is replenished from the buffer tank 95*a* into the recovery tank 92*a* in response to reduction in the amount of the ink in the recovery tank 92*a*. This makes it possible to resolve shortage of the ink in the recovery tank 92*a*.

If the liquid level Lf of the ink acquired by the supply liquid level acquisition part 815 is in the range Mid and if the liquid level Lr of the ink acquired by the recovery liquid level acquisition part 816 is in the range Low (circulation mode 4), the circulation pump controller 811 controls the circulation pump 902 in such a manner as to reduce output from the circulation pump 902 in feeding the ink. In this configuration, the amount of the ink fed from the recovery tank 92*a* to the supply tank 91*a* using the circulation pump 902 is reduced, making it possible to prevent the ink in the recovery tank 92*a* from being too little.

If the liquid level Lf of the ink acquired by the supply liquid level acquisition part 815 is in the range Low and if the liquid level Lr of the ink acquired by the recovery liquid level acquisition part 816 is in the range High (circulation mode 3), the replenishing solenoid valve controller 813 controls the replenishing solenoid valve Vl1 in such a manner as to close the replenishing solenoid valve Vl1 and the return solenoid valve controller 814 controls the return solenoid valve Vl2 in such a manner as to open the return solenoid valve Vl2. In this configuration, by taking advantage of timing of when the amount of the ink is large in the recovery tank 92*a*, settling of the ink in the buffer tank 95*a* can be reduced by circulating the ink along the circulation path Cc2.

If the liquid level Lf of the ink acquired by the supply liquid level acquisition part 815 is in the range Low and if the liquid level Lr of the ink acquired by the recovery liquid level acquisition part 816 is in the range High (circulation mode 3), the circulation pump controller 811 controls the circulation pump 902 in such a manner as to increase output from the circulation pump 902 in feeding the ink. In this configuration, the amount of the ink fed from the recovery tank 92*a* to the supply tank 91*a* using the circulation pump 902 is increased, making it possible to resolve shortage of the ink in the supply tank 91*a*.

In the above-described embodiment, the printing apparatus 3 corresponds to an example of a "printing apparatus" of the present invention, the control unit 81 corresponds to an example of a "control unit" of the present invention, the circulation pump controller 811 corresponds to an example of a "circulation pump controller" of the present invention, the replenishing pump controller 812 corresponds to an example of a "replenishing pump controller" of the present invention, the replenishing solenoid valve controller 813 corresponds to an example of a "first solenoid valve controller" of the present invention, the return solenoid valve controller 814 corresponds to an example of a "second solenoid valve controller" of the present invention, the supply liquid level acquisition part 815 corresponds to an example of a "supply liquid level acquisition part" of the present invention, the recovery liquid level acquisition part 816 corresponds to an example of a "recovery liquid level acquisition part" of the present invention, the return pipe 901 corresponds to an example of a "first return pipe" of the present invention, the circulation pump 902 corresponds to an example of a "circulation pump" of the present invention, the supply tank 91*a* corresponds to an example of a "supply tank" of the present invention, the supply pipe 91*b* corresponds to an example of a "supply pipe" of the present invention, the recovery tank 92*a* corresponds to an example of a "recovery tank" of the present invention, the recovery pipe 92*b* corresponds to an example of a "recovery pipe" of the present invention, the buffer tank 95*a* corresponds to an example of a "buffer tank" of the present invention, the replenishing pipe 95*b* corresponds to an example of a "replenishing pipe" of the present invention, the replenishing pump 951 corresponds to an example of a "replenishing pump" of the present invention, the return pipe 961 corresponds to an example of a "second return pipe" of the present invention, the supply liquid level detector 97 corresponds to an example of a "supply liquid level detector" of the present invention, the recovery liquid level detector 98 corresponds to an example of a "recovery liquid level detector" of the present invention, the circulation path Cc1 corresponds to an example of a "first circulation path" of the present invention, the replenishing path Cs corresponds to an example of a "replenishing path" of the present invention, the circulation path Cc2 corresponds to an example of a "second circulation path" of the present invention, the ejection head H corresponds to an example of an "ejection head" of the present invention, the replenishing solenoid valve Vl1 corresponds to an example of a "first solenoid valve" of the present invention, and the return solenoid valve Vl2 corresponds to an example of a "second solenoid valve" of the present invention.

The present invention is not limited to the above-described embodiment but various variations other than the matters described above can be devised without departing from the scope of the invention. For example, the threshold used by the supply liquid level detector 97 for detecting the liquid level Lf of the ink in the supply tank 91*a* is not limited to the first height LL, the second height LM, and the third height LH given in the above-described example but may be lower or higher than these heights.

Variations of the circulation mode executable by the ink supply, recovery, replenishing, and circulation mechanism 9 are not limited to the examples shown in FIG. 9.

In circulating the ink along the circulation path Cc2 (second circulation path), it is sufficient to cause the ink to flow to a degree allowing reduction in settling of a component of the ink. In this regard, the replenishing pump controller 812 may control the replenishing pump 951 in such a manner that output from the replenishing pump 951 in circulating the ink fed using the replenishing pump 951 along the circulation path Cc2 (circulation modes 5 to 9, for example) becomes lower than output from the replenishing pump 951 in replenishing the ink fed using the replenishing pump 951 from the buffer tank 95*a* into the recovery tank 92*a* along the replenishing path Cs (circulation modes 1, 2, 4, for example).

The present invention is applicable to every type of printing technique of ejecting ink from an ejection head having been replenished into the ejection head from a buffer tank storing the ink.

The printing apparatus may further comprises: a supply liquid level detector provided to the supply tank and detecting a supply liquid level corresponding to a liquid level of the ink in the supply tank; and a recovery liquid level detector provided to the recovery tank and detecting a recovery liquid level corresponding to a liquid level of the ink in the recovery tank, wherein the control unit further includes a supply liquid level acquisition part that acquires the supply liquid level detected by the supply liquid level detector and a recovery liquid level acquisition part that acquires the recovery liquid level detected by the recovery liquid level detector, the first solenoid valve controller controls opening and closing of the first solenoid valve on the basis of the supply liquid level detected by the supply liquid level detector and the recovery liquid level detected by the recovery liquid level detector, and the second solenoid valve controller controls opening and closing of the second solenoid valve on the basis of the supply liquid level detected by the supply liquid level detector and the recovery liquid level detected by the recovery liquid level detector. This configuration achieves replenishing of the ink into the recovery tank or circulation of the ink along the second circulation path in response to the liquid level of the ink in the supply tank (supply liquid level) and the liquid level of the ink in the recovery tank (recovery liquid level).

The printing apparatus may be configured so that the supply liquid level detector determines whether a liquid level of the ink in the supply tank is in a first supply liquid level range that is less than a first supply threshold, in a second supply liquid level range that is less than a second supply threshold higher than the first supply threshold and is equal to or higher than the first supply threshold, or in a third supply liquid level range that is less than a third supply threshold higher than the second supply threshold and is equal to or higher than the second supply threshold, and the recovery liquid level detector determines whether a liquid level of the ink in the recovery tank is in a first recovery liquid level range that is less than a first recovery threshold, in a second recovery liquid level range that is less than a second recovery threshold higher than the first recovery threshold and is equal to or higher than the first recovery threshold, or in a third recovery liquid level range that is less than a third recovery threshold higher than the second recovery threshold and is equal to or higher than the second recovery threshold. This configuration achieves replenishing of the ink into the recovery tank or circulation of the ink along the second circulation path in response to result of detection of each of the supply liquid level in the supply tank and the recovery liquid level in the recovery tank on a scale of at least three levels.

The printing apparatus may be configured so that if the supply liquid level acquired by the supply liquid level acquisition part is in the second supply liquid level range and if the recovery liquid level acquired by the recovery liquid level acquisition part is in the second recovery liquid level range or in the third recovery liquid level range, the first solenoid valve controller controls the first solenoid valve in such a manner as to close the first solenoid valve and the second solenoid valve controller controls the second solenoid valve in such a manner as to open the second solenoid valve to circulate the ink along the second circulation path. In this configuration, by taking advantage of timing of when the amount of the ink is large in each of the supply tank and the recovery tank, settling of the ink in the buffer tank can be reduced by circulating the ink along the second circulation path.

The printing apparatus may be configured so that if the supply liquid level acquired by the supply liquid level acquisition part is in the second supply liquid level range and if the recovery liquid level acquired by the recovery liquid level acquisition part is in the third recovery liquid level range, the circulation pump controller controls the circulation pump in such a manner as to make the circulation pump increase output feeding the ink. In this configuration, the amount of the ink fed from the recovery tank to the supply tank using the circulation pump is increased, making it possible to prevent excess of the ink in the recovery tank.

The printing apparatus may be configured so that if the supply liquid level acquired by the supply liquid level acquisition part is in the third supply liquid level range, the first solenoid valve controller controls the first solenoid valve in such a manner as to close the first solenoid valve and the second solenoid valve controller controls the second solenoid valve in such a manner as to open the second solenoid valve to circulate the ink along the second circulation path. In this configuration, by taking advantage of timing of when the amount of the ink is large in the supply tank, settling of the ink in the buffer tank can be reduced by circulating the ink along the second circulation path.

The printing apparatus may be configured so that if the supply liquid level acquired by the supply liquid level acquisition part is in the third supply liquid level range and if the recovery liquid level acquired by the recovery liquid level acquisition part is in the first recovery liquid level range or in the second recovery liquid level range, the circulation pump controller controls the circulation pump in such a manner as to make the circulation pump reduce output feeding the ink. In this configuration, the amount of the ink fed from the recovery tank to the supply tank using the circulation pump is reduced, making it possible to prevent excess of the ink in the supply tank.

The printing apparatus may be configured so that if the supply liquid level acquired by the supply liquid level acquisition part is in the third supply liquid level range and if the recovery liquid level acquired by the recovery liquid level acquisition part is in the third recovery liquid level range, the circulation pump controller controls the circulation pump in such a manner as to stop the circulation pump. In this configuration, feeding of the ink from the recovery tank to the supply tank using the circulation pump is stopped, making it possible to prevent excess of the ink in the supply tank.

The printing apparatus may be configured so that if the supply liquid level acquired by the supply liquid level acquisition part is in the first supply liquid level range and if the recovery liquid level acquired by the recovery liquid level acquisition part is in the first recovery liquid level range or in the second recovery liquid level range, the first solenoid valve controller controls the first solenoid valve in such a manner as to open the first solenoid valve and the second solenoid valve controller controls the second solenoid valve in such a manner as to close the second solenoid valve to feed the ink to the buffer tank along the replenishing path. In this configuration, the ink is replenished from the buffer tank into the recovery tank in response to reduction in the amount of the ink in the supply tank. The ink thereby replenished into the recovery tank is fed from the recovery tank to the supply tank using the circulation pump. As a result, it is possible to resolve shortage of the ink in the supply tank.

The printing apparatus may be configured so that if the supply liquid level acquired by the supply liquid level acquisition part is in the first supply liquid level range and if the recovery liquid level acquired by the recovery liquid level acquisition part is in the second recovery liquid level range, the circulation pump controller controls the circulation pump in such a manner as to make the circulation pump increase output feeding the ink. In this configuration, the amount of the ink fed from the recovery tank to the supply tank using the circulation pump is increased, making it possible to resolve shortage of the ink in the supply tank.

The printing apparatus may be configured so that if the supply liquid level acquired by the supply liquid level acquisition part is in the second supply liquid level range and if the recovery liquid level acquired by the recovery liquid level acquisition part is in the first recovery liquid level range, the first solenoid valve controller controls the first solenoid valve in such a manner as to open the first solenoid valve and the second solenoid valve controller controls the second solenoid valve in such a manner as to close the second solenoid valve to circulate the ink along the first circulation path. In this configuration, the ink is replenished from the buffer tank into the recovery tank in response to reduction in the amount of the ink in the recovery tank. This makes it possible to resolve shortage of the ink in the recovery tank.

The printing apparatus may be configured so that if the supply liquid level acquired by the supply liquid level acquisition part is in the second supply liquid level range and if the recovery liquid level acquired by the recovery liquid level acquisition part is in the first recovery liquid level range, the circulation pump controller controls the circulation pump in such a manner as to make the circulation pump reduce output feeding the ink. In this configuration, the amount of the ink fed from the recovery tank to the supply tank using the circulation pump is reduced, making it possible to prevent the ink in the recovery tank from being too little.

The printing apparatus may be configured so that if the supply liquid level acquired by the supply liquid level acquisition part is in the first supply liquid level range and if the recovery liquid level acquired by the recovery liquid level acquisition part is in the third recovery liquid level range, the first solenoid valve controller controls the first solenoid valve in such a manner as to close the first solenoid valve and the second solenoid valve controller controls the second solenoid valve in such a manner as to open the second solenoid valve. In this configuration, if the amount of the ink in the recovery tank is large, the ink is not replenished from the buffer tank into the recovery tank, making it possible to prevent excess of the ink in the recovery tank.

The printing apparatus may be configured so that if the supply liquid level acquired by the supply liquid level acquisition part is in the first supply liquid level range and if the recovery liquid level acquired by the recovery liquid level acquisition part is in the third recovery liquid level range, the circulation pump controller controls the circulation pump in such a manner as to make the circulation pump increase output feeding the ink. In this configuration, the amount of the ink fed from the recovery tank to the supply tank using the circulation pump is increased, making it possible to resolve shortage of the ink in the supply tank.

In circulating the ink along the second circulation path, it is sufficient to cause the ink to flow to a degree allowing reduction in settling of a component of the ink. In this regard, the printing apparatus may be configured so that the replenishing pump controller controls the replenishing pump in such a manner that output from the replenishing pump in circulating the ink fed using the replenishing pump along the second circulation path becomes lower than output from the replenishing pump in replenishing the ink fed using the replenishing pump from the buffer tank into the recovery tank along the replenishing path.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A printing apparatus comprising:

an ejection head having a nozzle from which ink is to be ejected;

a supply tank storing the ink to be supplied to the ejection head;

a supply pipe forming flow path connection between the supply tank and the ejection head, and feeding the ink from the supply tank to the ejection head;

a recovery tank storing the ink recovered from the ejection head;

a recovery pipe forming flow path connection between the recovery tank and the ejection head, and feeding the ink from the ejection head to the recovery tank;

a first return pipe forming flow path connection between the recovery tank and the supply tank, and feeding the ink from the recovery tank to the supply tank;

a circulation pump provided in the first return pipe and arranged between the recovery tank and the supply tank, and feeding the ink from the recovery tank to the supply tank;

a buffer tank storing the ink to be replenished into the recovery tank;

a replenishing pipe forming flow path connection between the buffer tank and the recovery tank, and feeding the ink from the buffer tank to the recovery tank;

a replenishing pump provided in the replenishing pipe and arranged between the buffer tank and the recovery tank, and feeding the ink from the buffer tank to the recovery tank;

a first solenoid valve provided in the replenishing pipe and arranged between the replenishing pump and the recovery tank, allowing feeding of the ink from the buffer tank to the recovery tank through the replenishing pipe using the replenishing pump by being opened, and interrupting feeding of the ink from the buffer tank to the recovery tank through the replenishing pipe using the replenishing pump by being closed;

a second return pipe forming flow path connection of a branch point provided in the replenishing pipe and arranged at a position between the first solenoid valve and the replenishing pump to the buffer tank, and feeding the ink from the branch point in the replenishing pipe to the buffer tank;

a second solenoid valve provided in the second return pipe and arranged between the branch point and the buffer tank, allowing feeding of the ink from the branch point to the buffer tank through the second return pipe by being opened, and interrupting feeding of the ink from the branch point to the buffer tank through the second return pipe by being closed; and a control unit including a circulation pump controller that controls the circulation pump, a replenishing pump controller that controls the replenishing pump, a first solenoid valve controller that controls the first solenoid valve, and a second solenoid valve controller that controls the second solenoid valve, wherein if the circulation pump controller controls the circulation pump in such a manner as to feed the ink from the recovery tank toward the supply tank using the circulation pump, the ink is circulated along a first circulation path along which the ink is fed from the recovery tank to the supply tank through the first return pipe, is then fed to the ejection head through the supply pipe, and is further fed from the ejection head to the recovery tank through the recovery pipe, if the first solenoid valve controller controls the first solenoid valve in such a manner as to open the first solenoid valve, if the second solenoid valve controller controls the second solenoid valve in such a manner as to close the second solenoid valve, and if the replenishing pump controller controls the replenishing pump in such a manner as to feed the ink from the buffer tank toward the recovery tank using the replenishing pump, the ink is replenished into the recovery tank along a replenishing path along which the ink is fed from the buffer tank via the first solenoid valve to the recovery tank through the replenishing pipe, and if the first solenoid valve controller controls the first solenoid valve in such a manner as to close the first solenoid valve, if the second solenoid valve controller controls the second solenoid valve in such a manner as to open the second solenoid valve, and if the replenishing pump controller controls the replenishing pump in such a manner as to feed the ink from the buffer tank toward the branch point using the replenishing pump, the ink is circulated along a second circulation path along which the ink is fed from the buffer tank to the branch point though the replenishing pipe and then fed from the branch point to the buffer tank through the second return pipe.

2. The printing apparatus according to claim 1, further comprising:

a supply liquid level detector provided to the supply tank and detecting a supply liquid level corresponding to a liquid level of the ink in the supply tank; and a recovery liquid level detector provided to the recovery tank and detecting a recovery liquid level corresponding to a liquid level of the ink in the recovery tank, wherein the control unit further includes a supply liquid level acquisition part that acquires the supply liquid level detected by the supply liquid level detector and a recovery liquid level acquisition part that acquires the recovery liquid level detected by the recovery liquid level detector, the first solenoid valve controller controls opening and closing of the first solenoid valve on the basis of the supply liquid level detected by the supply liquid level detector and the recovery liquid level detected by the recovery liquid level detector, and the second solenoid valve controller controls opening and closing of the second solenoid valve on the basis of the supply liquid level detected by the supply liquid level detector and the recovery liquid level detected by the recovery liquid level detector.

3. The printing apparatus according to claim 2, wherein the supply liquid level detector determines whether a liquid level of the ink in the supply tank is in a first supply liquid level range that is less than a first supply threshold, in a second supply liquid level range that is less than a second supply threshold higher than the first supply threshold and is equal to or higher than the first supply threshold, or in a third supply liquid level range that is less than a third supply threshold higher than the second supply threshold and is equal to or higher than the second supply threshold, and the recovery liquid level detector determines whether a liquid level of the ink in the recovery tank is in a first recovery liquid level range that is less than a first recovery threshold, in a second recovery liquid level range that is less than a second recovery threshold higher than the first recovery threshold and is equal to or higher than the first recovery threshold, or in a third recovery liquid level range that is less than a third recovery threshold higher than the second recovery threshold and is equal to or higher than the second recovery threshold.

4. The printing apparatus according to claim 3, wherein if the supply liquid level acquired by the supply liquid level acquisition part is in the second supply liquid level range and if the recovery liquid level acquired by the recovery liquid level acquisition part is in the second recovery liquid level range or in the third recovery liquid level range, the first solenoid valve controller controls the first solenoid valve in such a manner as to close the first solenoid valve and the second solenoid valve controller controls the second solenoid valve in such a manner as to open the second solenoid valve to circulate the ink along the second circulation path.

5. The printing apparatus according to claim 4, wherein if the supply liquid level acquired by the supply liquid level acquisition part is in the second supply liquid level range and if the recovery liquid level acquired by the recovery liquid level acquisition part is in the third recovery liquid level range, the circulation pump controller controls the circulation pump in such a manner as to make the circulation pump increase output feeding the ink.

6. The printing apparatus according to claim 3, wherein if the supply liquid level acquired by the supply liquid level acquisition part is in the third supply liquid level range, the first solenoid valve controller controls the first solenoid valve in such a manner as to close the first solenoid valve and the second solenoid valve controller controls the second solenoid valve in such a manner as to open the second solenoid valve to circulate the ink along the second circulation path.

7. The printing apparatus according to claim 6, wherein if the supply liquid level acquired by the supply liquid level acquisition part is in the third supply liquid level range and if the recovery liquid level acquired by the recovery liquid level acquisition part is in the first recovery liquid level range or in the second recovery liquid level range, the circulation pump controller controls the circulation pump in such a manner as to make the circulation pump reduce output feeding the ink.

8. The printing apparatus according to claim 6, wherein if the supply liquid level acquired by the supply liquid level acquisition part is in the third supply liquid level range and if the recovery liquid level acquired by the recovery liquid level acquisition part is in the third recovery liquid level range, the circulation pump controller controls the circulation pump in such a manner as to stop the circulation pump.

9. The printing apparatus according to claim 3, wherein if the supply liquid level acquired by the supply liquid level acquisition part is in the first supply liquid level range and if the recovery liquid level acquired by the recovery liquid level acquisition part is in the first recovery liquid level range or in the second recovery liquid level range, the first solenoid valve controller controls the first solenoid valve in such a manner as to open the first solenoid valve and the second solenoid valve controller controls the second solenoid valve in such a manner as to close the second solenoid valve to feed the ink to the buffer tank along the replenishing path.

10. The printing apparatus according to claim 9, wherein if the supply liquid level acquired by the supply liquid level acquisition part is in the first supply liquid level range and if the recovery liquid level acquired by the recovery liquid level acquisition part is in the second recovery liquid level range, the circulation pump controller controls the circulation pump in such a manner as to make the circulation pump increase output feeding the ink.

11. The printing apparatus according to claim 3, wherein if the supply liquid level acquired by the supply liquid level acquisition part is in the second supply liquid level range and if the recovery liquid level acquired by the recovery liquid level acquisition part is in the first recovery liquid level range, the first solenoid valve controller controls the first solenoid valve in such a manner as to open the first solenoid valve and the second solenoid valve controller controls the second solenoid valve in such a manner as to close the second solenoid valve to circulate the ink along the first circulation path.

12. The printing apparatus according to claim 11, wherein if the supply liquid level acquired by the supply liquid level acquisition part is in the second supply liquid level range and if the recovery liquid level acquired by the recovery liquid level acquisition part is in the first recovery liquid level range, the circulation pump controller controls the circulation pump in such a manner as to make the circulation pump reduce output feeding the ink.

13. The printing apparatus according to claim 3, wherein if the supply liquid level acquired by the supply liquid level acquisition part is in the first supply liquid level range and if the recovery liquid level acquired by the recovery liquid level acquisition part is in the third recovery liquid level range, the first solenoid valve controller controls the first solenoid valve in such a manner as to close the first solenoid valve and the second solenoid valve controller controls the second solenoid valve in such a manner as to open the second solenoid valve.

14. The printing apparatus according to claim 13, wherein if the supply liquid level acquired by the supply liquid level acquisition part is in the first supply liquid level range and if the recovery liquid level acquired by the recovery liquid level acquisition part is in the third recovery liquid level range, the circulation pump controller controls the circulation pump in such a manner as to make the circulation pump increase output feeding the ink.

15. The printing apparatus according to claim 1, wherein the replenishing pump controller controls the replenishing pump in such a manner that output from the replenishing pump in circulating the ink fed using the replenishing pump along the second circulation path becomes lower than output from the replenishing pump in replenishing the ink fed using the replenishing pump from the buffer tank into the recovery tank along the replenishing path.

16. An ink feeding method in a printing apparatus including: an ejection head having a nozzle from which ink is to be ejected; a supply tank storing the ink to be supplied to the ejection head; a supply pipe forming flow path connection between the supply tank and the ejection head, and feeding the ink from the supply tank to the ejection head; a recovery tank storing the ink recovered from the ejection head; a recovery pipe forming flow path connection between the recovery tank and the ejection head, and feeding the ink from the ejection head to the recovery tank; a first return pipe forming flow path connection between the recovery tank and the supply tank, and feeding the ink from the recovery tank to the supply tank; and a circulation pump provided in the first return pipe and arranged between the recovery tank and the supply tank, and feeding the ink from the recovery tank to the supply tank, the method comprising:

a first circulation step of feeding the ink from the recovery tank toward the supply tank using the circulation pump, thereby feeding the ink from the recovery tank to the supply tank through the first return pipe, then feeding the ink from the supply tank to the ejection head through the supply pipe, and further feeding the ink from the ejection head to the recovery tank through the recovery pipe;

a replenishing step of feeding the ink from a buffer tank to the recovery tank through a replenishing pipe using a replenishing pump provided in the replenishing pipe, the buffer tank storing the ink to be replenished into the recovery tank, the replenishing pipe forming flow path connection between the buffer tank and the recovery tank and feeding the ink from the buffer tank to the recovery tank; and a second circulation step of feeding the ink from the buffer tank using the replenishing pump to a branch point provided in the replenishing pipe and arranged between the replenishing pump and the recovery tank, thereby feeding the ink from the buffer tank to the branch point through the replenishing pipe and then feeding the ink from the branch point to the buffer tank through a second return pipe forming flow path connection between the branch point and the buffer tank, wherein the replenishing pipe is provided with a first solenoid valve arranged at a position between the branch point and the recovery tank, the first solenoid valve allows feeding of the ink from the buffer tank to the recovery tank through the replenishing pipe using the replenishing pump by being opened, and interrupts feeding of the ink from the buffer tank to the recovery tank through the replenishing pipe using the replenishing pump by being closed, the second return pipe is provided with a second solenoid valve arranged at a position between the branch point and the buffer tank, the second solenoid valve allows feeding of the ink from the branch point to the buffer tank through the second return pipe by being opened, and interrupts feeding of the ink from the branch point to the buffer tank through the second return pipe by being closed, in the replenishing step, the first solenoid valve is opened and the second solenoid valve is closed to feed the ink from the buffer tank toward the recovery tank using the replenishing pump, thereby feeding the ink from the buffer tank to the recovery tank via the first solenoid valve through the replenishing pipe, and in the second circulation step, the first solenoid valve is closed and the second solenoid valve is opened to feed the ink from the buffer tank toward the branch point using the replenishing pump, thereby feeding the ink from the buffer tank to the branch point through the replenishing pipe and then feeding the ink from the branch point to the buffer tank through the second return pipe.

* * * * *